US012083371B2

(12) United States Patent
Pahila

(10) Patent No.: US 12,083,371 B2
(45) **Date of Patent: *Sep. 10, 2024**

(54) FIRE PROTECTION NOZZLE, FIRE PROTECTION SPRINKLER, FIRE PROTECTION SYSTEMS, AND METHODS OF MANUFACTURING A FIRE PROTECTION NOZZLE AND A FIRE PROTECTION SPRINKLER

(71) Applicant: The Reliable Automatic Sprinkler Co. Inc., Liberty, SC (US)

(72) Inventor: Oliver Pahila, Liberty, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,447

(22) Filed: Aug. 29, 2023

(65) Prior Publication Data

US 2023/0398390 A1 Dec. 14, 2023

Related U.S. Application Data

(63) Continuation of application No. 18/158,511, filed on Jan. 24, 2023, now Pat. No. 11,819,715, which is a continuation of application No. 17/132,418, filed on Dec. 23, 2020, now Pat. No. 11,583,714, which is a continuation of application No. 16/333,964, filed as (Continued)

(51) Int. Cl.

| | |
|---|---|
| ***A62C 37/12*** | (2006.01) |
| ***A62C 37/11*** | (2006.01) |
| ***B05B 1/26*** | (2006.01) |

(52) U.S. Cl.

CPC .............. *A62C 37/12* (2013.01); *A62C 37/11* (2013.01); *B05B 1/26* (2013.01); *B05B 1/262* (2013.01); *B05B 1/265* (2013.01); *B05B 1/267* (2013.01)

(58) Field of Classification Search

CPC ........... A62C 37/11; A62C 37/12; B05B 1/26; B05B 1/262; B05B 1/265; B05B 1/267

USPC ........................ 169/16, 37–41; 239/498, 504

See application file for complete search history.

(56) References Cited

U.S. PATENT DOCUMENTS 5,366,022 A 11/1994 Meyer et al.
5,392,993 A 2/1995 Fischer (Continued)

OTHER PUBLICATIONS

Standard for the Installation of Sprinkler Systems, NFPA 13 Chapter 8, National Fire Protection Association (Quincy Massachusetts), 2012, pp. 1 to 100.

(Continued)

*Primary Examiner* — Steven J Ganey

(74) *Attorney, Agent, or Firm* — Venable LLP

(57) ABSTRACT

A fire protection nozzle includes a body having two frame arms having proximal ends connected to an outlet of the body, and distal ends, the two frame arms defining a frame arm plane, and a junction formed by the distal ends of the frame arms, the junction including a central bore and an outer wall. A deflector is mounted to the body, and includes a planar member having a mounting hole in a center of the planar member to receive the outer wall of the junction, and a plurality of slots on a periphery of the planar member. The plurality of slots includes first slots, second slots, third slots, and fourth slots.

101 Claims, 7 Drawing Sheets

Related U.S. Application Data application No. PCT/US2017/051881 on Sep. 15, 2017, now Pat. No. 10,898,746.

(60) Provisional application No. 62/395,409, filed on Sep. 16, 2016.

(56) References Cited

U.S. PATENT DOCUMENTS

| | | | | |
|---|---|---|---|---|
| 5,669,449 | A * | 9/1997 | Polan | A62C 37/08 169/37 |
| 5,829,684 | A | 11/1998 | Fischer | |
| 5,839,667 | A | 11/1998 | Fischer | |
| 5,865,256 | A | 2/1999 | Pounder | |
| 6,854,668 | B2 | 2/2005 | Wancho et al. | |
| 7,165,624 | B1 | 1/2007 | Fischer | |
| 7,201,234 | B2 | 4/2007 | Rogers et al. | |
| 7,819,201 | B2 | 10/2010 | Pounder | |
| 8,122,969 | B1 * | 2/2012 | Fischer | A62C 37/08 169/37 |
| 8,172,001 | B2 | 5/2012 | Tow et al. | |
| 8,485,270 | B2 | 7/2013 | Fischer | |
| 8,905,151 | B2 | 12/2014 | Silva, Jr. et al. | |
| 8,925,641 | B1 | 1/2015 | Fischer | |
| 9,132,305 | B2 | 9/2015 | Feenstra | |
| 10,898,746 | B2 | 1/2021 | Pahila | |
| 11,583,714 | B2 | 2/2023 | Pahila | |
| 11,819,715 | B2 | 11/2023 | Pahila | |
| 2010/0032173 | A1 * | 2/2010 | Fischer | A62C 31/02 169/37 |
| 2011/0036598 | A1 | 2/2011 | Pahila | |
| 2013/0043050 | A1 | 2/2013 | Marmoav et al. | |
| 2014/0216769 | A1 | 8/2014 | Almeida et al. | |
| 2015/0246253 | A1 | 9/2015 | Miller et al. | |

OTHER PUBLICATIONS

'FM Global Property Loss Prevention Data Sheets,' FM Global (Johnston, Rhode Island), Jan. 2014, Revision Jan. 2018, pp. 1 to 119.

Notification of Transmittal of the International Search Report and the Written Opinion of the International Searching Authority, or the Declaration, the International Search Report and the Written Opinion, mailed Jan. 17, 2018, issued in corresponding International Patent Application No. PCT/US2017/51881.

International Preliminary Report on Patentability, mailed Oct. 29, 2018, issued in corresponding International Patent Application No. PCT/US2017/51881.

* cited by examiner

FIRE PROTECTION NOZZLE, FIRE PROTECTION SPRINKLER, FIRE PROTECTION SYSTEMS, AND METHODS OF MANUFACTURING A FIRE PROTECTION NOZZLE AND A FIRE PROTECTION SPRINKLER

This application is a continuation of U.S. patent application Ser. No. 18/158,511, filed Jan. 24, 2023, now U.S. Pat. No. 11,819,715, issued Nov. 21, 2023, which is a continuation of U.S. patent application Ser. No. 17/132,418, filed Dec. 23, 2020, now U.S. Pat. No. 11,583,714, issued Feb. 21, 2023, which is a continuation of U.S. patent application Ser. No. 16/333,964, filed Mar. 15, 2019, now U.S. Pat. No. 10,898,746, issued Jan. 6, 2021, which is a U.S. national stage application of International Patent Application No. PCT/US2017/051881, filed Sep. 15, 2017, which claims the benefit of U.S. Provisional Patent Application No. 62/395,409, filed on Sep. 16, 2016, each of which is incorporated by reference herein in its entirety.

BACKGROUND OF THE INVENTION

This disclosure relates generally to a fire protection nozzle, a fire protection sprinkler, systems comprising a fire protection nozzle, systems comprising a fire protection sprinkler, and methods of manufacture.

Storage facilities that store goods, such as warehouses, require fire protection systems designed to minimize damage and to prevent loss of the stored goods in the event of a fire. A fire protection system for use in a storage facility may include one or more pendent fire protection sprinklers connected to a fire extinguishing fluid supply via a fluid supply conduit (i.e., piping). A fire protection system is activated when a thermally responsive element, such as a glass bulb or a soldered link, fails, releasing a seal and opening an output orifice of the fire protection sprinkler. When the output orifice is opened, the fire extinguishing fluid, such as water, flows through the piping and the fire protection sprinkler and strikes a deflector mounted to the fire protection sprinkler. The deflector may be a circular planar disk having a number of slots arranged along the periphery of the disk, thereby producing a circular spray pattern of the fire extinguishing fluid. To meet the requirements for supply of fire extinguishing fluid over a given area to be protected, the particular arrangement of the slots on the deflector may be changed. Available fire protection systems meet the requirements for storage facilities having ceiling heights of up to thirty-five feet (10.67 meters). These systems, however, are not adequate for protection of storage facilities having heights up to forty feet (12.19 meters) or more.

In addition to the ceiling height of a storage facility, these fire protection systems are also designed based on the type of hazard (i.e., the commodity) stored in the storage facility. As an example, a fire protection system may be designed to protect an occupancy hazard including classes I-IV and Group A cartoned, unexpanded plastics, as defined by the National Fire Protection Association Standard 13 ("NFPA 13"), and as defined in the Property Loss Prevention Data Sheets 8-1 and 8-9, published by Factory Mutual (FM) Global Insurance of Johnston, Rhode Island.

Fire protection systems are also required in tunnels, such as those serving highway or railroad systems, to limit the destruction of fires involving passenger road vehicles, cargo trucks, or railroad cars. These systems must also be designed for exposure to freezing temperatures, since tunnels do not typically include heating systems. Fire protection systems designed for use in tunnels include nozzles that are connected to a fluid supply via a fluid supply conduit (i.e., piping). The fire protection system may activate using an automatic detection unit or a manual activation unit. A deflector is mounted to each nozzle so that, when the fluid is supplied to the nozzle, the fluid strikes the deflector. The deflector may be a circular planar disk having a number of slots arranged on a periphery of the disk, thereby producing a circular spray pattern. In the fire protection sprinklers described, the circular spray pattern of adjacent sprinklers and nozzles may overlap, reducing the efficiency of the fire protection sprinkler system. In addition, the spacing provided between adjacent sprinklers and nozzles in these systems may be relatively small to ensure that the fire protection system meets the requirements for protection of a given area to be protected.

SUMMARY OF THE INVENTION

An object of our invention is to provide a fire protection system, including a nozzle, for use in tunnels for highways or railroads. The nozzle produces a spray pattern that improves the efficiency of the nozzle in delivering the fluid to the area to be protected. Another object of our invention is to provide a fire protection system in which nozzles may be provided at an increased spacing of up to 20 feet (6.096 meters) from each other, reducing the number of nozzles required by the system and, therefore, reducing the overall cost of the system.

It is another object of our invention to provide a fire protection sprinkler for protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty five feet.

Yet another object of our invention is to provide a fire protection sprinkler that produces a rectangular spray pattern, improving the efficiency of the fire protection sprinkler in delivering the fluid to the area to be protected.

Still another object of our invention is to provide a fire protection sprinkler system in which adjacent fire protection sprinklers may be provided at an increased spacing of up to 14 feet (4.27 meters) from each other, reducing the number of sprinklers required by the system and, therefore, reducing the overall cost of the system.

In one embodiment of the present invention, a fire protection nozzle for providing fire protection in a tunnel comprises a body comprising an inlet orifice, an outlet orifice, the inlet orifice and the outlet orifice defining a body axis and a flow passage for a fluid that flows through the body in an output direction, two frame arms having proximal ends connected to the outlet and distal ends, the two frame arms defining a frame arm plane, and a junction formed by the distal ends of the frame arms at a distance from the outlet orifice, the junction including a central bore and a cylindrical outer wall. The nozzle further comprises a circular deflector configured to be mounted to the body of the nozzle. The circular deflector comprises a planar disk having a mounting hole in a center of the planar disk, the mounting hole configured to receive the cylindrical outer wall of the junction, and a plurality of slots on a periphery of the circular planar disk that define a plurality of tines. The plurality of slots includes four radial first slots each having a first slot axis that is at an angle of about 45° relative to the frame arm plane, and at an angle of about 90° relative to an adjacent first slot, each of the first slots having a first slot depth. Four radial second slots are also provided on the circular planar disk, each having a second slot axis that is at an angle of about 0° or 90° relative to the frame arm plane, and at an angle of about 90° relative to an adjacent second slot, each of the second slots having a second slot depth that is less than the first slot depth. Eight radial third slots are provided, each being adjacent to a second slot, and each having a third slot axis that is less than about 45° relative to the second slot axis of the adjacent second slot. Each third slot has a third slot depth that is less than the second slot depth. In addition, eight fourth slots are provided, each being adjacent to a first slot, and each having a first slot portion having a radial axis, and a second slot portion, extending outward from the first slot portion relative to a center of the planar disk, the second slot portion having a non-radial axis, and a width that increases from an inner end of the second slot portion toward an outer, peripheral end of the second slot portion. Each fourth slot has a fourth slot depth that is less than the first slot depth. The nozzle has a K-factor of at least 28 $gpm/(psi)^{1/2}$.

In another embodiment, the circular deflector is secured to the junction by rolling the cylindrical outer wall of the junction over an edge of the mounting hole on a surface of the circular deflector opposite to a surface that faces the output orifice. In yet another embodiment, the central bore of the junction has a threaded surface, and the circular deflector is secured to the junction by a securing portion that includes a securing screw having a head and a threaded portion that contacts the threaded surface of the central bore of the junction, and a retaining nut that is mounted to the head of the securing screw.

In yet another embodiment, a fire protection nozzle further comprises comprising at least two body deflectors that extend from each of the two frame arms in the frame arm plane at an angle relative to the body axis, each of the at least two body deflectors having an inner planar surface that faces the junction, the inner planar surface having a depth in the frame arm plane and a width, perpendicular to the depth, wherein the body deflectors extend in the frame arm plane at an angle of about 10° to about 80° from the body axis. In another embodiment, the width of the inner planar surface of the body deflectors is about 0.3 to about 1.2 times the diameter of the circular deflector. In yet another embodiment, the body deflectors extend in the frame arm plane at an angle of about 45° from the body axis.

In still another embodiment, a fire protection system for providing fire protection in a tunnel comprises a fluid supply for supply of a fluid, piping connected to the fluid supply, and a plurality of fire protection nozzles, each nozzle being connected to the piping. Each nozzle comprises a body comprising an inlet orifice, an outlet orifice, the inlet orifice and the outlet orifice defining a body axis and a flow passage for a fluid that flows through the body in an output direction, two frame arms having proximal ends connected to the outlet and distal ends, the two frame arms defining a frame arm plane, and a junction formed by the distal ends of the frame arms at a distance from the outlet orifice, the junction including a central bore and a cylindrical outer wall. Each nozzle further comprises a circular deflector configured to be mounted to the body of the nozzle. The circular deflector comprises a planar disk having a mounting hole in a center of the planar disk, the mounting hole configured to receive the cylindrical outer wall of the junction, and a plurality of slots on a periphery of the circular planar disk that define a plurality of tines. The plurality of slots includes four radial first slots each having a first slot axis that is at an angle of about 45° relative to the frame arm plane, and at an angle of about 90° relative to an adjacent first slot, each of the first slots having a first slot depth. Four radial second slots are also provided, each having a second slot axis that is at an angle of about 0° or about 90° relative to the frame arm plane, and at an angle of about 90° relative to an adjacent second slot, each of the second slots having a second slot depth that is less than the first slot depth. Eight radial third slots are provided, each being adjacent to a second slot, and each having a third slot axis that is less than about 45° relative to the second slot axis of an adjacent second slot, the third slots having a third slot depth that is less than the second slot depth. Eight fourth slots are provided, each being adjacent to a first slot, and each having a first slot portion having a radial axis, and a second slot portion, extending outward from the first slot portion relative to a center of the planar disk, the second slot portion having a non-radial axis, and a width that increases from an inner end of the second slot portion toward an outer, peripheral end of the second slot portion, and each of the fourth slots having a fourth slot depth that is less than the first slot depth. The fire protection system further comprises an actuation valve connected to the fluid supply, wherein, when the actuation valve is operated, the fluid supply supplies the fluid to the piping and the plurality of nozzles and the fluid is delivered by the nozzles to the area to be protected in a spray pattern. In addition, the nozzles are positioned at a spacing of up to 20 feet by 20 feet, and each nozzle has a K-factor of at least 28 $gpm/(psi)^{1/2}$.

In another embodiment, the body of each nozzle of the fire protection system has external threads on an outer surface near the inlet orifice, wherein the piping includes connection portions having threads on an inner surface, and wherein the external threads on the outer surface of the body of each nozzle contact the threads on the inner surface of the piping. In another embodiment, the circular deflector on each nozzle is secured to the junction of each nozzle by rolling the cylindrical outer wall of the junction over an edge of the mounting hole on a surface of the circular deflector opposite to a surface that faces the output orifice. In another embodiment, the central bore of the junction of each nozzle has a threaded surface, and the circular deflector is secured to the junction by a mounting portion that includes a securing screw having a head and a threaded portion that contact the threaded surface of the central bore of the junction a retaining nut that is mounted to the head of the securing screw.

In another embodiment, each nozzle of a fire protection system further comprises at least two body deflectors that extend from each of the two frame arms in the frame arm plane at an angle relative to the body axis, each of the at least two body deflectors having an inner planar surface that faces the junction, the inner planar surface having a depth in the frame arm plane and a width, perpendicular to the depth. In this embodiment, the width of the inner planar surface of the body deflectors is about 0.3 to about 1.2 times the diameter of the circular deflector. In another embodiment, the body deflectors of each nozzle of the fire protection system extend in the frame arm plane at an angle of about 10° to about 80° from the body axis. In another embodiment, the body deflectors of each nozzle of the fire protection system extend in the frame arm plane at an angle of about 45° relative to the body axis.

In another embodiment, an extended coverage fire protection sprinkler for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty five feet is provided. The sprinkler comprises a body comprising an inlet orifice, an outlet orifice, the inlet orifice and the outlet orifice defining a body axis and a flow passage for a fluid that flows through the body in an output direction, two frame arms having proximal ends connected to the outlet and distal ends, the two frame arms defining a frame arm plane, and a junction formed by the distal ends of the frame arms at a distance from the outlet orifice, the junction including a central bore having threads on an inner surface, and a cylindrical outer wall. The sprinkler further comprises a circular deflector configured to be mounted to the body of the sprinkler, the circular deflector comprising a disk having a mounting hole in a center of the disk, the mounting hole configured to receive the cylindrical outer wall of the junction, and a plurality of slots on a periphery of the disk that define a plurality of tines. The plurality of slots includes two radial first slots each having a first slot axis that is at an angle of about 90° relative to the plane defined by the frame arms, each of the first slots having a first slot depth. Four radial second slots are provided having a second slot axis that is at an angle of about 45° relative to the frame arm plane, each of the second slots having a second slot depth. Two third slots are provided, each having a third slot axis that coincides with the frame arm plane, the third slots having a third slot depth that is less than the first slot depth. Four fourth slots are provided, each being adjacent to third slot, and each having a fourth slot axis that is less than about 45° relative to the third slot axis of an adjacent third slot, the fourth slots having a fourth slot depth that is less than the third slot depth. Four fifth slots are provided, each being adjacent to one of the two first slots, and each fifth slot having a fifth slot axis that at an angle relative to the first slot axis of an adjacent first slot, and each of the fifth slots having a fifth slot depth that is less than the first slot depth. The sprinkler further comprises a securing portion configured to secure the circular deflector to the junction of the body. The securing portion includes a securing screw having a head and a threaded portion that contacts the threaded surface of the central bore of the junction when the securing screw is inserted into the central bore, and a retaining nut that is mounted to the head of the securing screw. The sprinkler further comprises an actuation mechanism including a thermally responsive element supported by the threaded portion of the securing screw that extends through the central bore of the junction, the thermally responsive element being configured to fail when ambient temperature reaches a predetermined temperature, and an outlet seal that is supported by the thermally responsive element and that seals the outlet orifice until the thermally responsive element fails. The sprinkler has a K-factor of at least 28 gpm/(psi)$^{1/2}$.

In another embodiment, each side of each of the third slots of the circular deflector of the sprinkler includes an inner point, and an outer point near the periphery of the circular disk, and each side of each of the fourth slots of the circular deflector includes an inner point, and an outer point near the periphery of the circular disk. In this embodiment, of the plurality of tines, a tine that is defined by a third slot and a fourth slot is bent about two axes defining a plane of the disk, so that the outer point on one side of the third slot is below a plane defined by the inner point on the one side of the third slot, the inner point on one side of the fourth slot, and the outer point on the one side of the fourth slot.

In yet another embodiment, the extended coverage fire protection sprinkler further comprises at least two body deflectors that extend from each of the two frame arms in the frame arm plane at an angle relative to the body axis, each of the at least two body deflectors having an inner planar surface that faces the junction, the inner planar surface having a depth in the frame arm plane and a width, perpendicular to the depth. In this embodiment, the body deflectors extend in the frame arm plane at an angle of about 10° to about 80° from the body axis. In another embodiment, the width of the inner planar surface of the body deflectors is about 0.3 to about 1.2 times the diameter of the circular deflector. In another embodiment, the body deflectors extend in the frame arm plane at an angle of about 45° from the body axis.

In another embodiment, a fire protection system for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty five feet is provided. The system comprises a fluid supply for supply of a fluid, piping connected to the fluid supply, and a plurality of fire protection sprinklers, each sprinkler being connected to the piping. Each sprinkler comprises a body comprising an inlet orifice, an outlet orifice, the inlet orifice and the outlet orifice defining a body axis and a flow passage for a fluid that flows through the body in an output direction, two frame arms having proximal ends connected to the outlet and distal ends, the two frame arms defining a frame arm plane, and a junction formed by the distal ends of the frame arms at a distance from the outlet orifice, the junction including a central bore and a cylindrical outer wall. Each sprinkler further comprises a circular deflector configured to be mounted to the body of the sprinkler, the circular deflector comprising a planar disk having a mounting hole in a center of the planar disk, the mounting hole configured to receive the cylindrical outer wall of the junction, and a plurality of slots on a periphery of the circular planar disk that define a plurality of tines. The plurality of slots includes two radial first slots each having a first slot axis that is at an angle of about 90° relative to the plane defined by the frame arms, each of the first slots having a first slot depth. Four radial second slots are provided, having a second slot axis that is at an angle of about 45° relative to the frame arm plane, each of the second slots having a second slot depth. Two third slots are provided, each having a third slot axis that coincides with the frame arm plane, the third slots having a third slot depth that is less than the first slot depth. Four fourth slots are provided, each being adjacent to a third slot, and each having a fourth slot axis that is less than about 45° relative to the third slot axis of an adjacent third slot, the fourth slots having a fourth slot depth that is less than the third slot depth. Four fifth slots are provided, each being adjacent to one of the two first slots, and each fifth slot having a fifth slot axis that at an angle relative to the first slot axis of an adjacent first slot, and each of the fifth slots having a fifth slot depth that is less than the first slot depth. Each sprinkler further comprises an actuation mechanism including a thermally responsive element supported by the threaded portion of the securing screw that extends through the central bore of the junction, the thermally responsive element being configured to fail when ambient temperature reaches a predetermined temperature, and an outlet seal that is supported by the thermally responsive element and that seals the outlet orifice until the thermally responsive element fails. When the thermally responsive element of at least one of the sprinklers fails, the fluid supply supplies the fluid to the at least one sprinkler through the piping, and the fluid is delivered by the at least one sprinkler to the area to be protected in a spray pattern. In addition, the sprinklers are positioned at a spacing of up to 14 feet by 14 feet, and the sprinkler has a K-factor of at least 28 gpm/(psi)$^{1/2}$.

In another embodiment, body of each sprinkler has external threads on an outer surface near the inlet orifice, and the piping includes connection portions having threads on an inner surface. In this embodiment, the external threads on the outer surface of the body of each sprinkler contact the threads on the inner surface of the piping. In another embodiment, the circular deflector on each sprinkler is secured to the junction of each sprinkler by rolling the cylindrical outer wall of the junction over an edge of the mounting hole on a surface of the circular deflector opposite to a surface that faces the output orifice.

In yet another embodiment, each side of each of the third slots of the circular deflector of each sprinkler includes an inner point, and an outer point near the periphery of the circular disk, and each side of each of the fourth slots of the circular deflector includes an inner point, and an outer point near the periphery of the circular disk. In this embodiment, of the plurality of tines, a tine that is defined by a third slot and a fourth slot is bent about two axes defining a plane of the disk, so that the outer point on one side of the third slot is below a plane defined by the inner point on the one side of the third slot, the inner point on one side of the fourth slot, and the outer point on the one side of the fourth slot.

In another embodiment, each sprinkler further comprises at least two body deflectors that extend from each of the two frame arms in the frame arm plane at an angle relative to the body axis, each of the at least two body deflectors having an inner planar surface that faces the junction, the inner planar surface having a depth in the frame arm plane and a width, perpendicular to the depth. In this embodiment, the width of the inner planar surface of the body deflectors is about 0.3 to about 1.2 times the diameter of the circular deflector. In another embodiment, the body deflectors of each sprinkler extend in the frame arm plane at an angle of about 10° to about 80° from the body axis. In another embodiment, the body deflectors of each sprinkler extend in the frame arm plane at an angle of about 45° from the body axis.

In another embodiment, a method of manufacturing a fire protection nozzle for providing fire protection in a tunnel comprises providing a body, the body comprising an inlet orifice, an outlet orifice, the inlet orifice and the outlet orifice defining a body axis and a flow passage for a fluid that flows through the body in an output direction, two frame arms having proximal ends connected to the outlet and distal ends, the two frame arms defining a frame arm plane, and a junction formed by the distal ends of the frame arms at a distance from the outlet orifice, the junction including a central bore and a cylindrical outer wall. The method further comprises mounting a circular deflector to the body of the nozzle, the circular deflector comprising a planar disk having a mounting hole in a center of the planar disk, the mounting hole configured to receive the cylindrical outer wall of the junction, and a plurality of slots on a periphery of the circular planar disk. The plurality of slots includes four radial first slots each having a first slot axis that is at an angle of about 45° relative to the frame arm plane, and at an angle of about 90° relative to an adjacent first slot, each of the first slots having a first slot depth. Four radial second slots are provided, each having a second slot axis that is at an angle of about 0° or 90° relative to the frame arm plane, and at an angle of about 90° relative to an adjacent second slot, each of the second slots having a second slot depth that is less than the first slot depth. Eight radial third slots are provided, each being adjacent to a second slot, and each having a third slot axis that is less than about 45° relative to the second slot axis of the adjacent second slot, each of the third slots having a third slot depth that is less than the second slot depth. Eight fourth slots are provided, each being adjacent to a first slot, and each having a first slot portion having a radial axis, and a second slot portion, extending outward from the first slot portion relative to a center of the planar disk, the second slot portion having a non-radial axis, and a width that increases from an inner end of the second slot portion toward an outer, peripheral end of the second slot portion, and each of the fourth slots having a fourth slot depth that is less than the first slot depth. In addition, the nozzle has a K-factor of 28 gpm/(psi)$^{1/2}$.

In another embodiment, the method further comprises securing the circular deflector to the junction by rolling the cylindrical outer wall of the junction over an edge of the mounting hole on a surface of the circular deflector opposite to a surface that faces the output orifice. In another embodiment, the central bore of the junction has a threaded surface, and the method further comprises securing the circular deflector to the junction by a securing portion that includes a securing screw having a head and a threaded portion that contacts the threaded surface of the central bore of the junction, and a retaining nut that is mounted to the head of the securing screw.

In yet another embodiment, the nozzle provided in the method further comprises at least two body deflectors that extend from each of the two frame arms in the frame arm plane at an angle relative to the body axis, each of the at least two body deflectors having an inner planar surface that faces the junction, the inner planar surface having a depth in the frame arm plane and a width, perpendicular to the depth. In this embodiment, the body deflectors extend in the frame arm plane at an angle of about 10° to about 80° from the body axis. In another embodiment, the width of the inner planar surface of the body deflectors is about 0.3 to about 1.2 times the diameter of the circular deflector. In another embodiment, the body deflectors extend in the frame arm plane at an angle of about 45° from the body axis.

In another embodiment, a method of manufacturing an extended coverage fire protection sprinkler for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty five feet, comprises providing a body having an inlet orifice, an outlet orifice, the inlet orifice and the outlet orifice defining a body axis and a flow passage for a fluid that flows through the body in an output direction, two frame arms having proximal ends connected to the outlet and distal ends, the two frame arms defining a frame arm plane, and a junction formed by the distal ends of the frame arms at a distance from the outlet orifice, the junction including a central bore having threads on an inner surface, and a cylindrical outer wall. The method further comprises mounting a circular deflector to the body of the sprinkler. The circular deflector comprises a disk having a mounting hole in a center of the disk, the mounting hole configured to receive the cylindrical outer wall of the junction, and a plurality of slots on a periphery of the disk. The plurality of slots includes two radial first slots each having a first slot axis that is at an angle of about 90° relative to the plane defined by the frame arms, each of the first slots having a first slot depth. Four radial second slots are provided, having a second slot axis that is at an angle of about 45° relative to the frame arm plane, each of the second slots having a second slot depth. Two third slots are provided, each having a third slot axis that coincides with the frame arm plane, the third slots having a third slot depth that is less than the first slot depth. Four fourth slots are provided, each being adjacent to a third slot, and each having a fourth slot axis that is less than about 45° relative to the third slot axis of an adjacent third slot, the fourth slots having a fourth slot depth that is less than the third slot depth. Four fifth slots are provided, each being adjacent to one of the two first slots, and each fifth slot having a fifth slot axis that is at an angle relative to the first slot axis of an adjacent first slot, and each of the fifth slots having a fifth slot depth that is less than the first slot depth. The method further comprises securing the circular deflector to the junction of the body using a securing portion that includes a securing screw having a head and a threaded portion that contacts the threaded surface of the central bore of the junction when the securing screw is inserted into the central bore, and a retaining nut that is mounted to the head of the securing screw. The method further comprises providing an actuation mechanism including a thermally responsive element supported by the threaded portion of the securing screw that extends through the central bore of the junction, the thermally responsive element being configured to fail when ambient temperature reaches a predetermined temperature, and an outlet seal that is supported by the thermally responsive element and that seals the outlet orifice until the thermally responsive element fails. In addition, the sprinkler has a K-factor of 28 gpm/(psi)$^{1/2}$.

In another embodiment, each side of each of the third slots of the circular deflector of the sprinkler, provided as a part of the method, includes an inner point, and an outer point near the periphery of the circular disk, and each side of each of the fourth slots of the circular deflector includes an inner point, and an outer point near the periphery of the circular disk. In this embodiment, of the plurality of tines, a tine that is defined by a third slot and a fourth slot is bent about two axes defining a plane of the disk, so that the outer point on one side of the third slot is below a plane defined by the inner point on the one side of the third slot, the inner point on one side of the fourth slot, and the outer point on the one side of the fourth slot.

In another embodiment, the body of the sprinkler, provided as a part of the method, further comprises at least two body deflectors that extend from each of the two frame arms in the frame arm plane at an angle relative to the body axis, each of the at least two body deflectors having an inner planar surface that faces the junction, the inner planar surface having a depth in the frame arm plane and a width, perpendicular to the depth. The body deflectors extend in the frame arm plane at an angle of about 10° to about 80° from the body axis. In another embodiment, the width of the inner planar surface of the body deflectors is about 0.3 to about 1.2 times the diameter of the circular deflector. In another embodiment, the body deflectors extend in the frame arm plane at an angle of about 45° from the body axis.

BRIEF DESCRIPTION OF THE DRAWINGS

Examples of certain embodiments of a fire protection nozzle and a fire protection sprinkler, according to the present invention, are illustrated in the accompanying figures, which form a part of this disclosure.

DETAILED DESCRIPTION OF THE INVENTION

Figure 1:
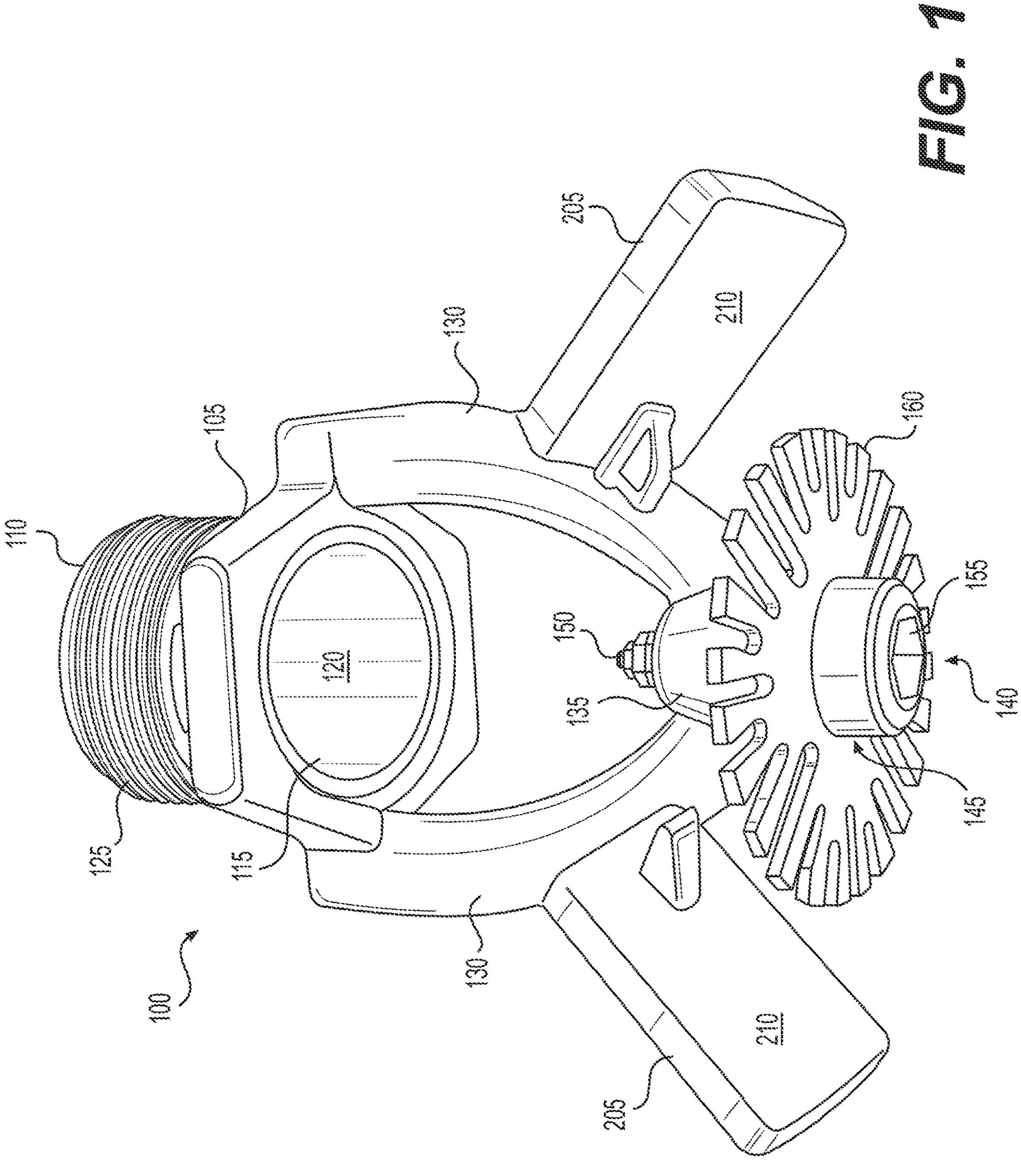
FIG. 1 is an isometric view of a fire protection nozzle according to a preferred embodiment of the invention.
Figure 2:
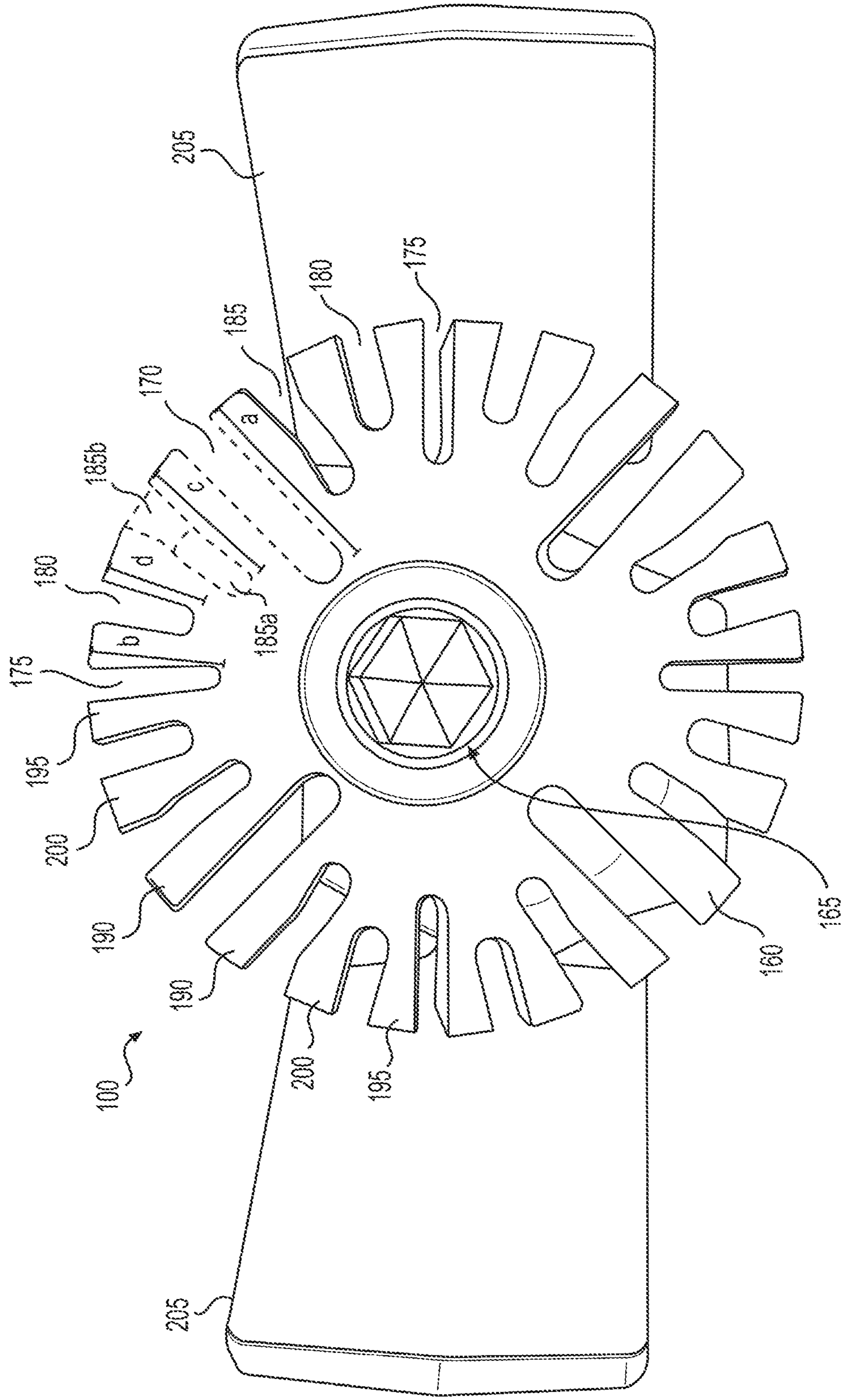
FIG. 2 is a bottom view of the fire protection nozzle according to a preferred embodiment of the invention.

In a preferred embodiment, a fire protection nozzle 100, as shown in FIGS. 1 and 2, may be used in a fire protection system for a tunnel that serves a highway or a railroad. The fire protection system includes a fluid supply that supplies a fluid, such as water, a network of piping connected to the fluid supply, and a plurality of fire protection nozzles 100 connected at various positions to the network of piping. In these systems, the nozzles 100 are actuated centrally, such that, in a case in which fire valves controlling the pipes are operated (e.g., automatically or manually) in response to a fire, fluid is supplied to some or all of the nozzles 100, and is delivered by the nozzles 100 to control or to suppress the fire. In this application, temperature-sensitive actuation elements are not required in the nozzles 100. In addition, because the supply of the fluid to the nozzles 100 is controlled centrally within the fire protection system, the nozzles 100 do not require closure seals.

As shown, the nozzle 100 has a body 105 with an inlet orifice 110 and an outlet orifice 115 defining a flow passage 120 for the fluid along an axis of the body 105. The nozzle 100 connects to the piping network of the fire protection system using external threads 125 that are provided on an outer surface of the body 105 at an inlet end of the nozzle 100.

The body 105 has two frame arms 130 that extend from the outlet end of the nozzle 100 in a downward direction (i.e., in the general direction of flow of the fluid, or an output direction). The two frame arms 130 meet at a junction 135 that is a distance from the outlet orifice 115. The junction 135 has a central bore 140 that extends through the junction 135 in the output direction, and a cylindrical wall portion 145 on a lower end of the junction 135. An inner surface of the junction 135 may be threaded. A first deflector 160 is mounted to the body 105 at the junction 135 by, for example, positioning a mounting hole 165 of the deflector 150 over the junction 135, and rolling the cylindrical wall portion 145 of the junction 135 over the surface of the first deflector 160 defining the mounting hole 165. That is, when the first deflector 160 is mounted on the junction 135, the cylindrical wall portion 145 extends through the mounting hole 165 of the first deflector 160, so that rolling of that cylindrical wall portion 145 over the surface of the first deflector 160 serves to secure the first deflector 160 to the body 105 of the nozzle 100. Alternatively, the first deflector 160 may be mounted to the junction 135 using a securing screw 150 that is inserted through the mounting hole 165 of the first deflector 160 and is threaded into the central bore 140 of the junction 135, and may be secured to the body 105 using a retaining nut 155. In one embodiment, second deflectors 205 may also be provided, each second deflector 205 being mounted on a respective one of the frame arms 130. When the fluid is supplied to the nozzle 100, the fluid enters the inlet orifice 110 of the body 105, exits through the outlet orifice 115 of the body 105, and impacts the junction 135 and the first deflector 160. The first deflector 160 directs the fluid downward and outward in a spray pattern, in order to quickly and efficiently control a fire.

As shown in FIG. 2, the first deflector 160 is a circular planar disk 160*a* having the mounting hole 165 in the center for mounting the first deflector 160 to the junction 135 of the nozzle 100. The first deflector 160 includes a plurality of slots 170, 175, 180, 185 of varying depths and shapes, that define a plurality of tines 190, 195, and 200 of the first deflector 160. In particular, four first slots 170 are provided at equally-spaced positions on the first deflector 160, and each extends along a first slot axis that is at an angle, for example, of about 45°, relative to a plane defined by the frame arms 130 of the nozzle 100. Each of the first slots 170 is a straight slot that extends radially on the planar disk (i.e., the first slot axis coincides with a radius of the circular planar disk 160*a*), and has a constant width. In addition, each of the first slots 170 has a depth a, measured from the outer periphery toward the center of the circular planar disk 160*a*.

Four second slots 175 are provided at equally-spaced positions on the circular planar disk 160*a*, each second slot 175 being equally-spaced between two first slots 170. That is, each second slot 175 has a second slot axis that is at an angle, for example, of about 45°, relative to the first slot axis of two first slots 170. Two diametrically opposing slots of the second slots 175 have axes that coincide with the plane defined by the frame arms 130 of the nozzle 100. Each of the second slots 175 is a straight slot having a radial axis (i.e., the second slot axis coincides with a radius of the circular planar disk 160*a*), and has a constant width. The second slots 175 have a slot depth b that is shorter than the slot depth a of the first slots 170.

Eight third slots 180 are provided on the circular planar disk 160*a*. Each of the second slots 175 is adjacent to two of the third slots 180, as shown in FIG. 2. Each of the third slots 180 is a straight slot having a radial axis (i.e., a third slot axis coincides with a radius of the circular planar disk 160*a*), and has a constant width. The third slots 180 have a slot depth c that is less than the slot depth b of the second slots 175.

Eight fourth slots 185 are provided on the circular planar disk 160*a*. Each of the first slots 160 is adjacent to two of the fourth slots 185, as shown in FIG. 2. In addition, each of the fourth slots 185 is also adjacent to a third slot 180. Each fourth slot 185 has a first portion 185*a*, having a constant width and a radial axis (i.e., a first portion axis coincides with a radius of the circular planar disk 160*a*). In addition, each fourth slot 185 has a second portion 185*b*, having a varying width, with an inner end of the second portion 185*b* being narrower than an outer end of the second portion 185*b*, the outer end being the end near the periphery of the circular planar disk 160*a*. In addition, an axis of the second portion 185*b* of the fourth slot 185 does not coincide with a radius of the circular planar disk 160*a*. That is, the fourth slots 175 are non-radial, at least in part, relative to the circular planar disk 160*a*.

First tines 190 of the first deflector 160 are defined by a first slot 170 and an adjacent fourth slot 185. Second tines 195 are defined by a second slot 175 and an adjacent third slot 180. Third tines 200 are defined by a third slot 180 and an adjacent fourth slot 185. In this embodiment, as shown in FIG. 2, the first deflector 160 has eight first tines 190, eight second tines 195, and eight third tines 200. Of course, additional or fewer slots and tines may be provided on the deflector 160, depending on the application or design criteria.

When the first deflector 160 is mounted to the junction 135 of the nozzle 100, and the fluid is supplied from the fluid supply to the piping network, and through the outlet orifice 115 of the nozzle 100, some of the fluid flows downward through the slots 170, 175, 180, and 185, and some of the fluid is redirected by the tines 190, 195, and 200 of the first deflector in outward and upward directions. By this arrangement, the fluid can be sprayed in a generally circular spray pattern to an area below the nozzle 100.

In addition, in the embodiment including the second deflectors 205, the nozzle 100 can further shape the spray pattern of the fluid to direct the fluid toward a fire below the nozzle 100. That is, at least some of the fluid that is redirected by the tines 190, 195, and 200 of the first deflector 160 strikes the second deflectors 205. The second deflector 205 is shaped and positioned so as to intercept some or all of this fluid, and to redirect the fluid at least partly in the downward direction toward the fire. Additionally, the second deflectors 205 aid in shaping the spray pattern provided by the first deflector 160 of the nozzle 100. That is, as noted herein, the first deflector 160 may tend to produce a generally circular spray pattern, and, by redirecting some of the fluid that strikes the tines 190, 195, and 200 of the first deflector 160, the second deflectors 205 cause the spray pattern to have a more oblong, and preferably, a generally rectangular, shape.

The second deflectors 205 are diametrically opposed to each other relative to a center of the first deflector 160. In addition, the second deflectors 205 are provided in the plane defined by the frame arms 130, and are provided integrally with the frame arms 130 on the body 105 of the nozzle 100. Alternatively, the second deflectors 205 may be welded to the frame arms 130. As shown in FIG. 1, the second deflectors 205 are joined to the frame arms 130 at positions between the outlet orifice 115 of the body 105 and the junction 135. Each of the second deflectors 205 extends from the respective frame arm 130 at an angle, for example, of about 10° to about 80°, and more preferably, of about 30° to about 60°, and, even more preferably, of about 45° relative to the axis of the body 105 of the nozzle 100. That is, as shown in FIG. 1, each of the second deflectors 205 extends from the respective frame arm 130 in a downward and outward direction relative to the axis of the body 105 of the nozzle 100.

Each of the second deflectors 205 has an inner planar surface 210, and has a depth (i.e., a distance from the edge of the second deflector 205 joined to the frame arm 130 to a free edge) of 1 inch (25.4 mm), and a width (i.e., a distance between edges of the planar surface 210 of the second deflector 205 that is perpendicular to the depth) of 0.95 inch (24.13 mm). The depth and width of each of the second deflectors 205 are not limited to these values. Indeed, in another embodiment, the depth of each of the second deflectors 205 may be sufficient to intersect the plane of the circular planar disk 160*a* of the first deflector 160. The width of each of the second deflectors 205 may be defined relative to a diameter of the first deflector 160. For example, the width of each of the second deflectors 205 may be about 0.3 to about 1.2 times the diameter of the first deflector 160.

Some of the fluid that strikes the tines 190, 195, and 200 of the first deflector 160, and that is redirected in an upward and outward direction relative to the axis of the body 105 of the nozzle 100, impacts the inner planar surface 210 of each of the second deflectors 205. The fluid that strikes the inner planar surfaces 210 of the second deflectors 205 is thus redirected downward and/or outward from the nozzle 100, in an oblong and, preferably, a generally rectangular spray pattern. By virtue of the relative dimensions and angle of the second deflectors 205 relative to the first deflector 160 and to the axis of the body 105 of the nozzle 100, the efficiency of the nozzle 100 can be improved. That is, using the first deflector 160 and the second deflectors 205, the spray pattern of the fluid can be shaped to be approximately rectangular, thereby reducing overlap between spray patterns of adjacent nozzles.

A fire protection nozzle may be characterized by size according to a K-factor defined by $K=Q/\sqrt{p}$, where Q is the flow rate in gallons per minute from the outlet of the nozzle, and p is the residual pressure at the inlet of the sprinkler in pounds per square inch. According to one embodiment, the nozzle 100 has a nominal K-factor of approximately 28.0 $gpm/(psi)^{1/2}$, and may provide coverage for a tunnel with the nozzles 100 provided at a spacing of 20×20 feet (6.10×6.10 meters). The nozzle 100 may have a K-factor of up to 33.6 $gpm/(psi)^{1/2}$. While particular K-factor values are listed, higher and lower values are also within the scope of the invention (i.e., the K-factor may be a value of 15 to 60 $gpm/(psi)^{1/2}$ and, more particularly, from 25 to 45 $gpm/(psi)^{1/2}$).

In another embodiment, the first deflector 160 may include a different pattern of slots. In addition, the tines 190, 195, and 200 of the first deflector 160 between slots may be torsioned (i.e., twisted) relative to the plane of the circular planar disk 160*a*. This particular type of deflector is more suitable for use in a fire protection sprinkler, rather than a nozzle. It is, however, within the scope of the invention to use either of the deflector shapes disclosed herein in a fire protection sprinkler or a fire protection nozzle.

In a preferred embodiment, a fire protection sprinkler 300 may be used in a fire protection system for a storage facility having a ceiling height of forty feet (12.19 meters) or more. The fire protection system includes a fluid supply that supplies a fluid, such as water, a network of piping connected to the fluid supply, and a plurality of fire protection sprinklers 300 connected at various positions to the network of piping. In these systems, the sprinklers 300 are individually activated by a thermally responsive element, such as a fusible link 385, as a part of an actuation mechanism 365.

Figure 3:
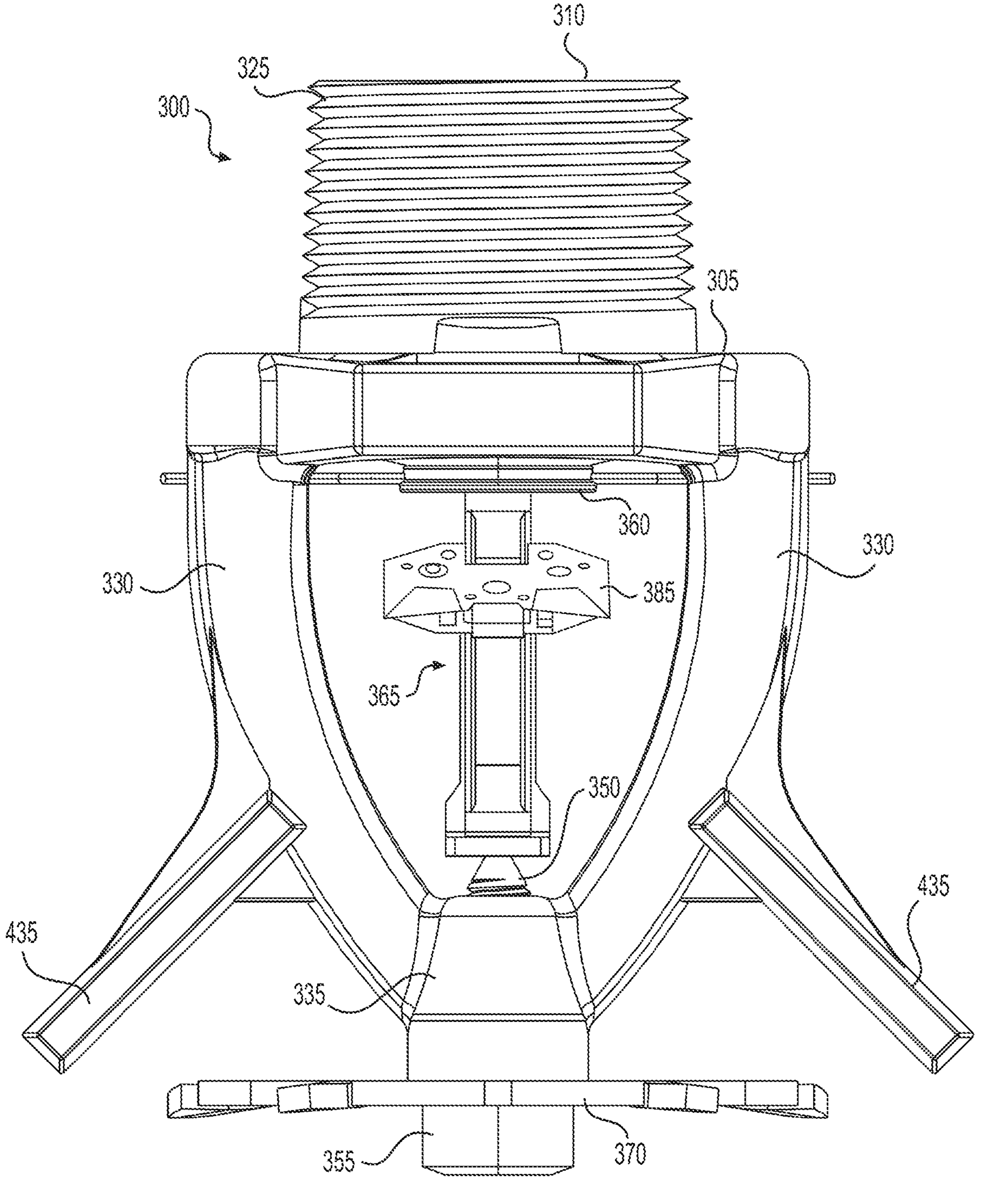
FIG. 3 is a side view of a fire protection sprinkler according to a preferred embodiment of the invention.
Figure 4:
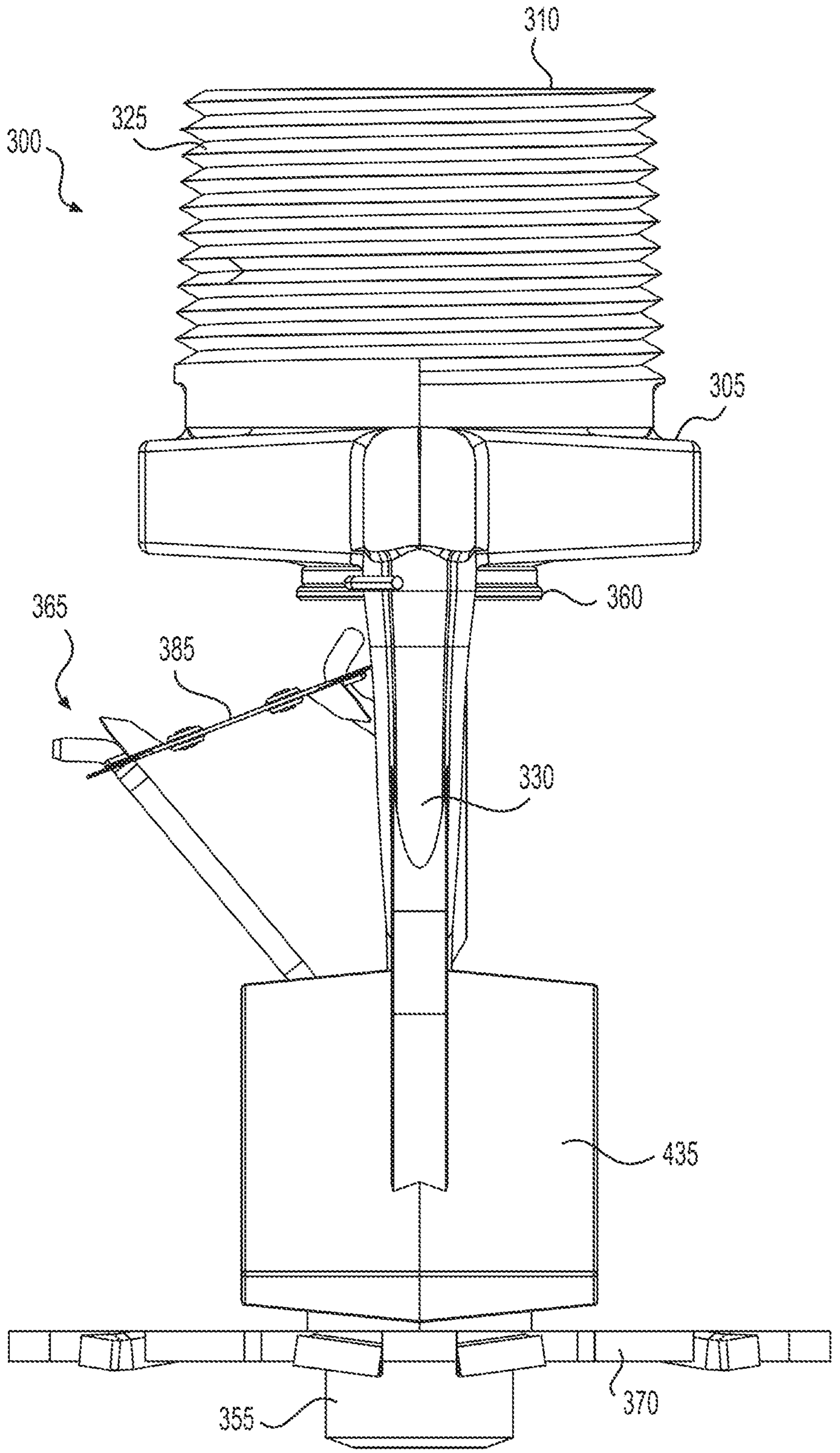
FIG. 4 is a side view of the fire protection sprinkler according to a preferred embodiment of the invention.
Figure 5:
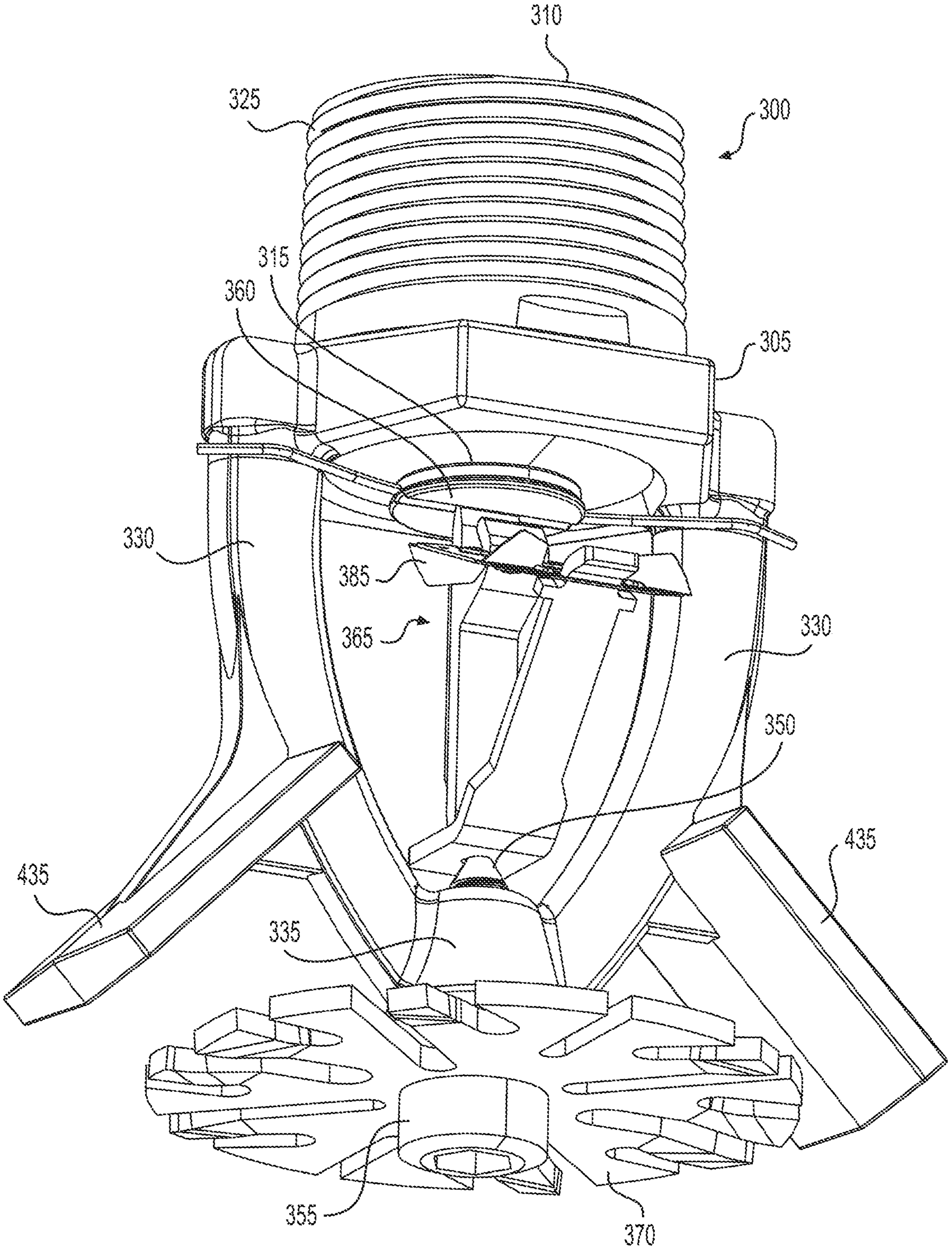
FIG. 5 is an isometric view of the fire protection sprinkler according to a preferred embodiment of the invention.

As shown in FIGS. 3 to 5, the fire protection sprinkler 300 has a body 305 with an inlet orifice 310 and an outlet orifice 315, the inlet orifice 310 and the outlet orifice 315 defining a flow passage 320 along an axis of the body 305, and defining an output direction from the inlet orifice 310 toward the outlet orifice 315. The sprinkler 300 connects to the piping network of the first protection system using external threads 325 provided on an outer surface of the body 305 at an inlet end of the sprinkler 300.

The body 305 has two frame arms 330 that extend from the inlet end of the sprinkler 300 to the outlet end (i.e., in the general direction of flow of the fluid). The two frame arms 330 meet at a junction 335 having an upper surface at a distance from the outlet orifice 315, and a lower surface, opposite to the upper surface in the output direction. The junction 335 may have a central bore 340 with threads on an inner surface of the central bore 340. The junction 335 may also have a cylindrical wall portion 345 that extends in the outlet direction. A first deflector 370, including a circular disk 375, is mounted to the body 305 at the junction 335 by, for example, positioning a mounting hole 380 of the first deflector 370 over the junction 335, and rolling the edges of the cylindrical wall portion 345 of the junction 335 over the surface of the first deflector 370 defining the mounting hole 380. That is, when the first deflector 370 is mounted on the junction 335, the cylindrical wall portion 345 of the junction 335 extends through the mounting hole 380 of the first deflector 370, so that rolling of that cylindrical wall portion 345 of the junction 235 over the surface of the first deflector 370 serves to secure the first deflector 370 to the body 305 of the sprinkler 300. Alternatively, the first deflector 37 may be mounted to the junction 335 using a securing screw 350 that is inserted through the mounting hole 380 of the first deflector 370 and is threaded into the central bore 340 of the junction 335, and may be secured to the body 305 using a retaining nut 355.

As noted, the actuation mechanism 365 is used to actuate the sprinkler 300. The actuation mechanism 365 maintains a sealed state of an outlet seal assembly 360 in the outlet orifice 315 of the sprinkler 300. As shown in FIGS. 3 and 5, the actuation mechanism 365 may include the fusible link 385 as a thermally responsive element that is supported by the securing screw 350 when the retaining nut 355 is inserted into the central bore 340 of the junction 335. In response to ambient temperature reaching a predetermined temperature, the fusible link 385 fails, releasing the actuation mechanism 365 and, therefore, releasing the outlet seal assembly 360 from the outlet orifice 315. Upon release of the outlet seal assembly 360, the fluid is permitted to flow through the flow passage 320 of the sprinkler 300. After the fluid exits through the outlet orifice 315, some of the fluid strikes the first deflector 370 mounted to the junction 335 and is redirected in an outward and/or an upward direction relative to an axis of the body 305 of the sprinkler 300.

In this embodiment, second deflectors 345 are also provided, each second deflector 435 being mounted on a respective one of the frame arms 330. When the fluid is supplied to the sprinkler 300, the fluid enters the inlet orifice 310 of the body 305, exits through the outlet orifice 315 of the body 305, and impacts the junction 335 and the first deflector 370. The first deflector 370 directs the fluid downward and outward in a spray pattern, in order to quickly and efficiently control a fire.

Figure 6:
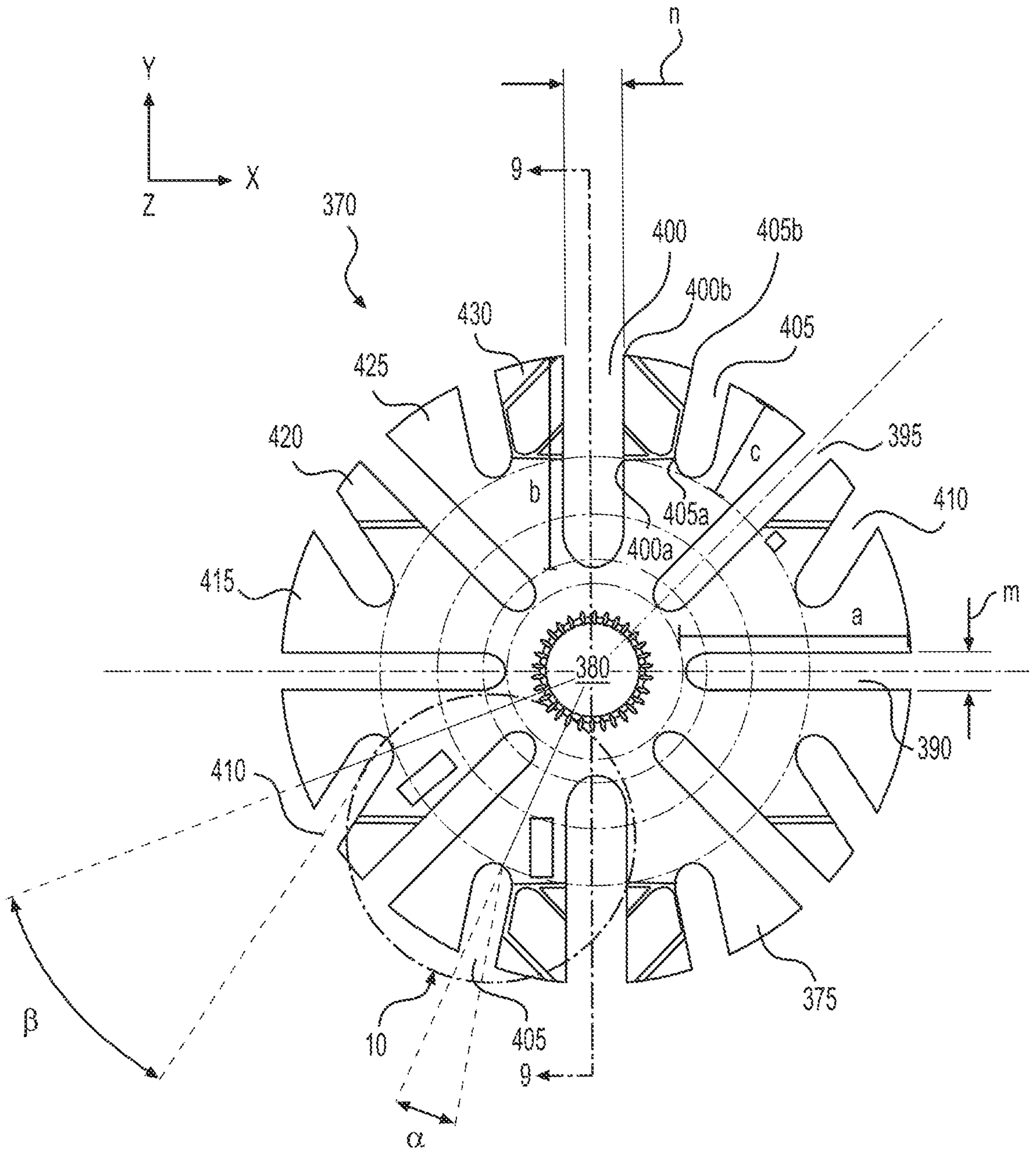
FIG. 6 is a plan view of a deflector for a fire protection sprinkler in a preferred embodiment of the invention.

The first deflector 370 will be described with reference to FIGS. 6 to 10. The first deflector 370 is a circular, mostly planar disk 375 having a mounting hole 380 in a center for mounting the first deflector 370 to the junction 335 of the sprinkler 300. The first deflector 370 includes a plurality of slots 390, 395, 400, 405, and 410 of varying depths and shapes, that define a plurality of tines 415, 420, 425, 430 of the first deflector 370. In particular, as shown in FIG. 6, two first slots 390 are provided at positions so as to extend along a first slot axis that is at an angle, for example, about 90° relative to the plane defined by the frame arms 330 of the sprinkler 300. Each of the first slots 390 is a straight slot that extends radially on the circular disk 375 (i.e., the first slot axis coincides with a radius of the circular disk 375) and has a constant width m. In addition, each of the first slots 390 has a depth a, measured from the outer periphery toward the center of the circular disk 375.

Four second slots 395 are provided at positions so as to extend along a second slot axis that is at an angle, for example, of about 45° relative to the plane defined by the frame arms 330 of the sprinkler 300. Each of the second slots 295 is a straight slot that extends radially on the circular disk 375 (i.e., the second slot axis coincides with a radius of the circular disk 375) and has a constant width m. In addition, each of the second slots 395 has the same depth a as the first slots 390.

Two third slots 400 are provided at diametrically opposing positions on the circular disk 375, and each third slot 400 extends along a third slot axis that coincides with the plane defined by the frame arms 330 of the sprinkler 300. Each of the third slots 400 is a straight slot having a radial axis (i.e., the second slot axis coincides with a radius of the circular disk), and has a constant width n. The third slots 400 have a slot depth b that is shorter than the slot depth a of the first and second slots 390, 395. In addition, as shown in the detail view of FIG. 10, each third slot 400 has an inner point 400*a*, on an inner surface, that demarcates the beginning of a torsioned tine 430 (described below) of the first deflector 370, and an outer point 400*b* on the inner surface that coincides with the outer periphery of the circular disk 375 and demarcates the end of the torsioned tine 430 of the first deflector 370.

Four fourth slots 405 are provided on the circular disk 375. Each of the two third slots 400 is adjacent to a third slot 405, as shown in FIG. 6. Each of the third slots 405 has a non-radial axis (i.e., the third slot axis does not coincide with a radius of the circular disk), the non-radial axis being at an angle α relative to a radius of the circular disk 375, as shown in FIG. 6. The angle α may be about 15°. The fourth slots 405 have a constant width and a slot depth c that is less than the slot depth b of the third slots 400. In addition, each of the fourth slots 405 has an inner point 405*a*, on an inner surface, that demarcates the beginning of the torsioned tine 430 of the first deflector 370, and an outer point 400*b* on the inner surface that coincides with the outer periphery of the circular disk 375 and demarcates the end of the torsioned tine 430 of the first deflector 370.

Four fifth slots 410 are provided on the circular disk 375. Each of the first slots 390 is adjacent to two fifth slots 410, as shown in FIG. 6. Each of the fifth slots 410 has a constant width and a non-radial axis (i.e., the fifth slot axis does not coincide with a radius of the first deflector 370). The non-radial axis of each of the fifth slots 410 is at an angle β relative to a radius of the circular disk 375. In the embodiment shown in FIG. 6, the angle β is between 0° and 90°.

The first to fifth slots 390, 395, 400, 405, and 410 have radiused ends (i.e., at an inner extremity, the end of each slot is radiused), as shown in FIG. 6. In addition, first tines 415 of the first deflector 370 are defined by a first slot 390 and an adjacent fifth slot 410. Second tines 420 are defined by a second slot 395 and an adjacent fifth slot 410. Third tines 425 are defined by a second slot 395 and an adjacent fourth slot 405. Fourth tines 430 are defined by a third slot 400 and a fourth slot 405. In this embodiment, as shown in FIG. 6, the first deflector 370 has four first tines 415, four second tines 420, four third tines 425, and four fourth tines 430. Of course, additional slots and tines may be provided on the deflector 370.

Figure 8:
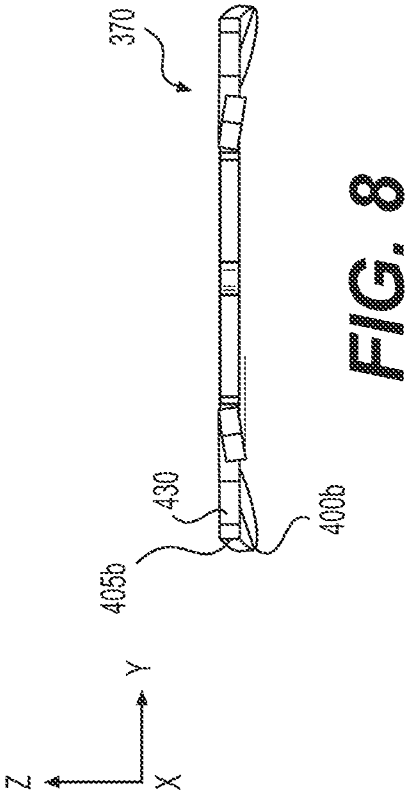
FIG. 8 is a side view of the deflector for a fire protection sprinkler in a preferred embodiment of the invention.
Figure 10:
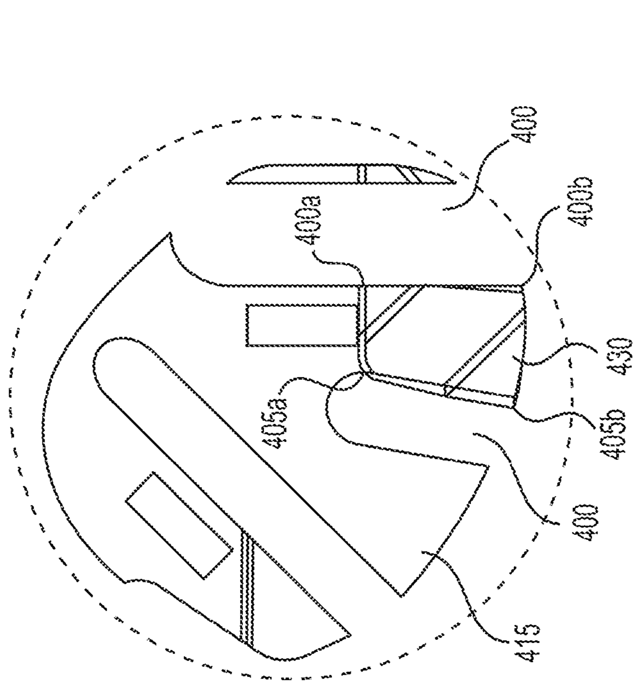
FIG. 10 is a detail view of the deflector for a fire protection sprinkler in a preferred embodiment of the invention.
Figure 7:
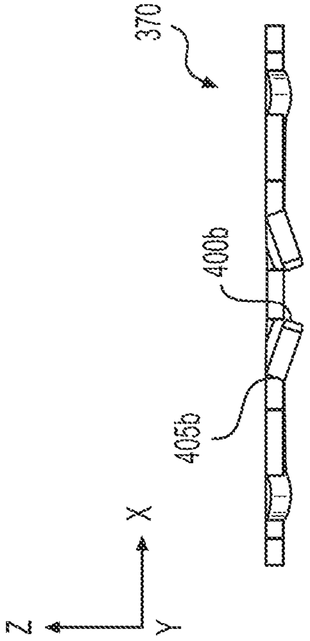
FIG. 7 is a side view of the deflector for a fire protection sprinkler in a preferred embodiment of the invention.
Figure 9:
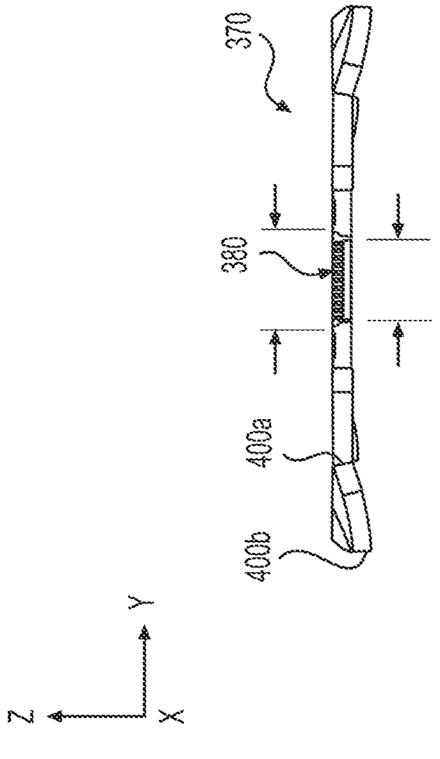
FIG. 9 is a sectional view of the deflector for a fire protection sprinkler in a preferred embodiment of the invention.

Each of fourth tines 430 between the third slot 400 and the fourth slot 405 are torsioned (i.e., bent in multiple planes). As shown in FIGS. 7 to 9, the fourth tine 430 is bent about at least two axes in three-dimensional space (in FIGS. 7 to 9, the fourth tine 430 is bent about an x-axis and a y-axis). The bending of the fourth tine 430 is also illustrated by the relative positions of the inner point of the third slot 400*a*, the outer point of the third slot 400*b*, the inner point of the fourth slot 400*a*, and the outer point of the fourth slot 400*b*. The inner point of the third slot 400*a* lies in the plane of the circular disk 375, and demarcates a point of the fourth tine 430 at which the fourth tine 430 is bent about a horizontal axis so that the outer point of the third slot 400*b* is below the plane of the circular disk 375 (i.e., the fourth tine 430 is bent about the x-axis, as shown in FIGS. 7 to 9). In addition, the inner point of the fourth slot 405*a* lies in the plane of the circular disk 375, and demarcates a point of the fourth tine 430 at which the fourth tine 430 is bent. The outer point of the fourth slot 405*b* is positioned within the plane of the circular disk 375 as with the inner point of the fourth slot 400*a*. The outer point of the third slot 400*b* is positioned lower than the inner point of the third slot 400*a* along a vertical axis (i.e., the z-axis in FIGS. 7 to 9), representing the bending of the fourth tine 430 about the y-axis. In addition, the outer point of the third slot 400*b* is positioned lower than the outer point of the fourth slot 405*b* along the vertical axis (z-axis), representing bending of the fourth tine 430 about a normal axis (i.e., the z-axis in FIGS. 7-9). The bending of the fourth tine 430 between the third slot 400 and the fourth slot 405 about multiple axes generates a curvilinear, torsioned surface on the fourth tine 430, as shown at least in FIGS. 7 to 9, and as shown schematically in FIG. 10.

When the first deflector 370 is mounted to the junction 335 of the sprinkler 300, and the fluid is supplied from the fluid supply to the piping network, and through the outlet orifice 315 of the sprinkler 300, some of the fluid flows downward through the slots 390, 395, 400, 405, and 410, and some of the fluid is redirected by the tines 415, 420, 425, and 430 of the first deflector 370 in outward and upward directions. By this arrangement, the fluid can be sprayed in a generally circular spray pattern to an area below the sprinkler 300.

In addition, the second deflectors 435 also serve to direct the fluid toward a fire below the sprinkler 300. That is, at least some of the fluid that strikes the tines 415, 420, 425, and 430 of the first deflector 370 and is redirected in outward and upward directions strikes the second deflectors 435. The second deflectors 435 are shaped and positioned so as to intercept some or all of this fluid, and to redirect the fluid at least partly in the downward direction toward the fire. Additionally, the second deflectors 435 aid in shaping the spray pattern provided by the first deflector 370 of the sprinkler 300. That is, as noted herein, the first deflector 370 may tend to produce a generally circular spray pattern, and, by redirecting some of the fluid that strikes the tines 415, 420, 425, 430 of the first deflector 370, the second deflectors 435 cause the spray pattern to have a more oblong, and preferably, a generally rectangular, shape.

The second deflectors 435 are diametrically opposed to each other relative to a center of the first deflector 370. In addition, the second deflectors 435 are provided in the plane defined by the frame arms 330, and are provided integrally with the frame arms 330 on the body 305 of the sprinkler 300. Alternatively, the second deflectors 435 may be welded to the frame arms 330. As shown in FIG. 3, the second deflectors 435 are joined to the frame arms 330 at positions between the outlet orifice 315 of the body 305 and the junction 335. Each of the second deflectors 435 extends from the respective frame arm 330 at an angle, for example, of about 10° to about 80°, and more preferably, of about 30° to about 60°, and, even more preferably, of about 45° relative to the axis of the body 305 of the sprinkler 300. That is, as shown in FIG. 3, each of the second deflectors 435 extends from the respective frame arm 330 in a downward and outward direction relative to the axis of the body 305 of the sprinkler 300.

Each of the second deflectors 435 has an inner planar surface, and has a depth (i.e., a distance from the edge of the second deflector 435 joined to the frame arm 330 to a free edge) of 1 inch (25.4 mm), and a width (i.e., a distance between edges of the planar surface of the second deflector 435 that is perpendicular to the depth) of 0.95 inch (24.13 mm). The depth and width of each of the second deflectors 435 are not limited to these values.

Indeed, in another embodiment, the depth of each of the second deflectors 435 may be sufficient to intersect the plane of the circular disk of the first deflector 370. The width of each of the second deflectors 435 may be defined relative to a diameter of the first deflector 370. For example, the width of each of the second deflectors 435 may be about 0.3 to about 1.2 times the diameter of the first deflector 370.

Some of the fluid that strikes the tines 415, 420, 425, and 430 of the first deflector 370, and that is redirected in an upward and outward direction relative to the axis of the body 305 of the sprinkler 300, impacts an inner planar surface 440 of each of the second deflectors 435. The fluid that strikes the inner planar surface 440 of the second deflectors 435 is thus redirected downward and/or outward from the sprinkler 300, in an oblong and, preferably, a generally rectangular spray pattern. By virtue of the relative dimensions and angle of the second deflectors 435 relative to the first deflector 370 and the axis of the body 305 of the sprinkler 300, the efficiency of the sprinkler 300 can be improved. That is, using the first deflector 370 and the second deflectors 435, it is possible to refine the spray pattern of the fluid to be almost "squared off," allowing avoidance of overlap between spray patterns of adjacent nozzles.

Further, the curvilinear, torsioned surface of the fourth tine 430 between the third slots 400 and the fourth slots 405 of the first deflector 370 creates a path of least resistance for fluid that strikes the first deflector 370 after exiting the outlet orifice 315 of the sprinkler 300. As a result, when the fluid is output by the sprinkler 300, a jet of fluid forms through the third slots 400 and the fourth slots 405, in a direction corresponding to the plane defined by the frame arms 330. The jet of fluid then strikes the second deflectors 435, and is directed in a squared off, or rectangular spray pattern. In a fire protection sprinkler system including sprinklers 300 having the above-described first deflector 370 that generates a jet of fluid by virtue of the torsioned fourth tine 430, and second deflectors 435 that create a rectangular spray pattern, it is possible to increase the spacing between sprinklers 300, thereby minimizing overlap between sprinklers 300.

In another embodiment, the first deflector may have at least one, and preferably four, apertures extending through the thickness of the deflector disk. These apertures may be located symmetrically around the center of the disk, and may be generally curvilinear in form, e.g., oval.

The sprinkler of this embodiment is designed for use in a sprinkler system for protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than 35 feet (10.67 meters).

As noted above with respect to a fire protection nozzle, a fire protection sprinkler may be characterized by size according to a K-factor defined by $K=Q/\sqrt{p}$, where Q is the flow rate in gallons per minute from the outlet of the sprinkler, and p is the residual pressure at the inlet of the sprinkler in pounds per square inch. According to one embodiment, the sprinkler 300 has a nominal K-factor of 28 gpm/(psi)$^{1/2}$ up to 33.6 gpm/(psi)$^{1/2}$. While particular K-factor values are listed, higher and lower values are also within the scope of the invention (i.e., the K-factor may be a value of 15 to 60 gpm/(psi)$^{1/2}$ and, more particularly, from 25 to 45 gpm/(psi)$^{1/2}$).

The sprinkler 300 having a nominal K-factor of 28 gpm/(psi)$^{1/2}$ up to 33.6 gpm/(psi)$^{1/2}$ may provide coverage for a storage occupancy with a ceiling height of 40 feet (12.19 meters), with the sprinklers provided at a spacing of over 10×10 feet (3.05×3.05 meters), and in particular, at a spacing or 12×12 feet (3.66×3.66 meters), or of 14×14 feet (4.27×4.27 meters). In addition, the sprinklers 300 are extended coverage sprinklers, as defined in NFPA 13 section 3.6.4.3, having a maximum coverage area of up to 196 square feet (18.21 square meters) for an extra hazard occupancy, as provided in NFPA 13 sections 8.8 and 8.9.

The descriptions of the embodiments herein are not limiting. For example, it is within the broad scope of the invention to vary the number of each type of slot or tine, as well as the exact dimensions of each type of slot or tine. Further, features of the first deflector, as described in the embodiments herein, may be combined. In addition, the second deflector need not be mounted directly on the frame arms, but may be supported directly by the nozzle or sprinkler body. Of course, other systems of support may be adopted as found to be convenient. Although the second deflector is shown as having two symmetric portions, the second deflector may instead be formed as a single element extending from one side of the apparatus to the other, or largely or entirely encircling the apparatus (i.e., the nozzle or the sprinkler), and neither the second deflector nor portions of the second deflector need to be generally planar as shown, but may be curved if preferred.

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

I claim:

1. A fire protection nozzle for providing fire protection, the fire protection nozzle comprising:

(A) a body comprising:
  (a) an inlet orifice;
  (b) an outlet orifice, the inlet orifice and the outlet orifice defining a body axis and a flow passage for a fluid that flows through the body in an output direction;
  (c) frame arms having proximal ends connected to the outlet orifice and distal ends, the frame arms defining a frame arm plane;
  (d) a junction formed by the distal ends of the frame arms at a distance from the outlet orifice, the junction including a central bore and an outer wall; and
  (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth; and (B) a planar member deflector configured to be mounted to the body of the nozzle, the deflector comprising a planar member having a plurality of slots on a periphery of the planar member that define a plurality of tines, the plurality of slots including:
  (a) first slots each having a first slot axis that is at an angle relative to the frame arm plane, and at another angle relative to an adjacent first slot, each of the first slots having a first slot depth;

(b) second slots each having a second slot axis that is at an angle relative to the frame arm plane, and at another angle relative to an adjacent second slot, each of the second slots having a second slot depth that is less than the first slot depth;

(c) third slots each being adjacent to a second slot, and each having a third slot axis that is at an angle relative to the second slot axis of the adjacent second slot, each of the third slots having a third slot depth that is less than the second slot depth; and (d) fourth slots each being adjacent to a first slot, and each having a first slot portion having an axis, and a second slot portion, extending outward from the first slot portion relative to a center of the planar member, the second slot portion having an axis, and a width that increases from an inner end of the second slot portion toward an outer, peripheral end of the second slot portion, and each of the fourth slots having a fourth slot depth that is less than the first slot depth.

2. The fire protection nozzle according to claim 1, wherein the central bore of the junction has a threaded surface, and wherein the planar member deflector is secured to the junction by a securing portion that includes:

(i) a securing screw having a head and a threaded portion that contacts the threaded surface of the central bore of the junction; and (ii) a retaining nut that is mounted to the securing screw.

3. The fire protection nozzle according to claim 1, wherein the nozzle has a K-factor of at least 28 gpm/(psi)$^{1/2}$.

4. The fire protection nozzle according to claim 1, wherein the planar member deflector produces a generally circular spray pattern and the body deflectors produce a generally rectangular shape spray pattern.

5. The fire protection nozzle according to claim 1, wherein the width of the inner planar surface of the body deflectors is about 0.3 to about 1.2 times the diameter of the planar member deflector.

6. The fire protection nozzle according to claim 1, wherein the body deflectors extend in the frame arm plane at an angle of about 10° to about 80° from the body axis.

7. The fire protection nozzle according to claim 6, wherein the body deflectors extend in the frame arm plane at an angle of about 30° to about 60° from the body axis.

8. The fire protection nozzle according to claim 7, wherein the body deflectors extend in the frame arm plane at an angle of about 45° from the body axis.

9. A fire protection system comprising:

(A) a plurality of fire protection nozzles, each nozzle comprising:

(a) a body comprising:

(i) an inlet orifice;

(ii) an outlet orifice, the inlet orifice and the outlet orifice defining a body axis and a flow passage for a fluid that flows through the body in an output direction;

(iii) frame arms having proximal ends connected to the outlet orifice and distal ends, the frame arms defining a frame arm plane;

(iv) a junction formed by the distal ends of the frame arms at a distance from the outlet orifice, the junction including a central bore and an outer wall; and (v) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth; and (b) a planar member deflector configured to be mounted to the body of the nozzle, the deflector comprising a planar member having a plurality of slots on a periphery of the planar member that define a plurality of tines, the plurality of slots including:

(i) first slots each having a first slot axis that is at an angle relative to the frame arm plane, and at another angle relative to an adjacent first slot, each of the first slots having a first slot depth;

(ii) second slots each having a second slot axis that is at an angle relative to the frame arm plane, and at another angle relative to an adjacent second slot, each of the second slots having a second slot depth that is less than the first slot depth;

(iii) third slots each being adjacent to a second slot, and each having a third slot axis that is at an angle relative to the second slot axis of an adjacent second slot, the third slots having a third slot depth that is less than the second slot depth; and (iv) fourth slots each being adjacent to a first slot, and each having a first slot portion having an axis, and a second slot portion, extending outward from the first slot portion relative to a center of the planar member, the second slot portion having an axis, and a width that increases from an inner end of the second slot portion toward an outer, peripheral end of the second slot portion, and each of the fourth slots having a fourth slot depth that is less than the first slot depth; and (B) an actuation valve connected to a fluid supply, wherein, when the actuation valve is operated, the fluid supply supplies a fluid to piping and the plurality of nozzles, such that the fluid is delivered by the nozzles to an area to be protected in a spray pattern.

10. The fire protection system according to claim 9, wherein each nozzle has a K-factor of at least 28 gpm/(psi)$^{1/2}$.

11. The fire protection system according to claim 9, wherein the nozzles are positioned at a spacing of up to 20 feet by 20 feet.

12. The fire protection system according to claim 9, wherein (1) the body of each nozzle has external threads on an outer surface near the inlet orifice, (2) the piping includes connection portions having threads on an inner surface, and (3) the external threads on the outer surface of the body of each nozzle contact the threads on the inner surface of the piping.

13. The fire protection system according to claim 9, wherein the central bore of the junction of each nozzle has a threaded surface, and wherein the planar member deflector is secured to the junction by a mounting portion that includes:

(1) a securing screw having a head and a threaded portion that contacts the threaded surface of the central bore of the junction; and (2) a retaining nut that is mounted to the securing screw.

14. The fire protection system according to claim 9, wherein the planar member deflector produces a generally circular spray pattern and the body deflectors produce a generally rectangular shape spray pattern.

15. The fire protection system according to claim 9, wherein the width of the inner planar surface of the body deflectors is about 0.3 to about 1.2 times the diameter of the planar member deflector.

16. The fire protection system according to claim 9, wherein the body deflectors extend in the frame arm plane at an angle of about 10° to about 80° from the body axis.

17. The fire protection system according to claim 16, wherein the body deflectors extend in the frame arm plane at an angle of about 30° to about 60° from the body axis.

18. The fire protection system according to claim 17, wherein the body deflectors extend in the frame arm plane at an angle of about 45° from the body axis.

19. An extended coverage fire protection sprinkler for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty-five feet, the extended coverage fire protection sprinkler comprising:

(A) a body comprising:
(a) an inlet orifice;
(b) an outlet orifice, the inlet orifice and the outlet orifice defining a body axis and a flow passage for a fluid that flows through the body in an output direction;
(c) frame arms having proximal ends connected to the outlet orifice and distal ends, the frame arms defining a frame arm plane;
(d) a junction formed by the distal ends of the frame arms at a distance from the outlet orifice, the junction including a central bore having threads on an inner surface, and an outer wall; and
(e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth;

(B) a planar member deflector configured to be mounted to the body of the sprinkler, the deflector comprising a planar member having a plurality of slots on a periphery of the planar member that define a plurality of tines, the plurality of slots including:
(a) first slots each having a first slot axis that is at an angle relative to the plane defined by the frame arms, each of the first slots having a first slot depth;
(b) second slots having a second slot axis that is at an angle relative to the frame arm plane, each of the second slots having a second slot depth;
(c) third slots each having a third slot axis that coincides with the frame arm plane, the third slots having a third slot depth that is less than the first slot depth;
(d) fourth slots each being adjacent to a third slot, and each having a fourth slot axis that is at an angle relative to the third slot axis of an adjacent third slot, the fourth slots having a fourth slot depth that is less than the third slot depth; and
(e) fifth slots each being adjacent to one of the first slots, and each fifth slot having a fifth slot axis that is at an angle relative to the first slot axis of an adjacent first slot, and each of the fifth slots having a fifth slot depth that is less than the first slot depth; and (C) an actuation mechanism including:
(a) a thermally responsive element supported by a threaded portion of a securing screw that extends through the central bore of the junction, the thermally responsive element being configured to fail when ambient temperature reaches a predetermined temperature; and
(b) an outlet seal that is supported by the thermally responsive element and that seals the outlet orifice until the thermally responsive element fails.

20. The extended coverage fire protection sprinkler according to claim 19, wherein each side of each of the third slots of the planar member deflector includes:
(i) an inner point; and
(ii) an outer point near the periphery of the planar member,
wherein each side of each of the fourth slots of the planar member deflector includes:
(i) an inner point; and
(ii) an outer point near the periphery of the planar member, and
wherein, of the plurality of tines, a tine that is defined by a third slot and a fourth slot is bent about two axes defining a plane of the planar member, so that the outer point on one side of the third slot is below a plane defined by the inner point on the one side of the third slot, the inner point on one side of the fourth slot, and the outer point on the one side of the fourth slot.

21. The extended coverage fire protection sprinkler according to claim 19, wherein the planar member deflector produces a generally circular spray pattern and the body deflectors produce a generally rectangular shape spray pattern.

22. The extended coverage fire protection sprinkler according to claim 19, wherein the width of the inner planar surface of the body deflectors is about 0.3 to about 1.2 times the diameter of the planar member deflector.

23. The extended coverage fire protection sprinkler according to claim 19, wherein the body deflectors extend in the frame arm plane at an angle of about 10° to about 80° from the body axis.

24. The extended coverage fire protection sprinkler according to claim 23, wherein the body deflectors extend in the frame arm plane at an angle of about 30° to about 60° from the body axis.

25. The extended coverage fire protection sprinkler according to claim 24, wherein the body deflectors extend in the frame arm plane at an angle of about 45° from the body axis.

26. A fire protection system for storage applications including protection of an occupancy hazard including classes I-IV and Group A cartoned, unexpanded plastics, as defined by NFPA 13 and FM Global Property Loss Prevention Data Sheets 8-1 and 8-9,stored in a storage area having a ceiling height of greater than thirty-five feet, the fire protection system comprising:
a plurality of fire protection sprinklers, each sprinkler comprising:
(a) a body comprising:
(i) an inlet orifice;
(ii) an outlet orifice, the inlet orifice and the outlet orifice defining a body axis and a flow passage for a fluid that flows through the body in an output direction;
(iii) frame arms having proximal ends connected to the outlet orifice and distal ends, the frame arms defining a frame arm plane;

(iv) a junction formed by the distal ends of the frame arms at a distance from the outlet orifice, the junction including a central bore and an outer wall; and (v) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth;

(b) a planar member deflector configured to be mounted to the body of the sprinkler, the deflector comprising a planar member having a plurality of slots on a periphery of the planar member that define a plurality of tines, the plurality of slots including:

(i) first slots each having a first slot axis that is at an angle relative to the plane defined by the frame arms, each of the first slots having a first slot depth;

(ii) second slots having a second slot axis that is at an angle relative to the frame arm plane, each of the second slots having a second slot depth;

(iii) third slots each having a third slot axis that coincides with the frame arm plane, the third slots having a third slot depth that is less than the first slot depth;

(iv) fourth slots each being adjacent to a third slot, and each having a fourth slot axis that is at an angle relative to the third slot axis of an adjacent third slot, the fourth slots having a fourth slot depth that is less than the third slot depth; and (v) fifth slots each being adjacent to one of the first slots, and each fifth slot having a fifth slot axis that is at an angle relative to the first slot axis of an adjacent first slot, and each of the fifth slots having a fifth slot depth that is less than the first slot depth; and (c) an actuation mechanism including:

(i) a thermally responsive element supported by a threaded portion of a securing screw that extends through the central bore of the junction, the thermally responsive element being configured to fail when ambient temperature reaches a predetermined temperature; and (ii) an outlet seal that is supported by the thermally responsive element and that seals the outlet orifice until the thermally responsive element fails, wherein, when the thermally responsive element of at least one of the sprinklers fails, a fluid supply supplies fluid to the at least one sprinkler through piping, such that the fluid is delivered by the at least one sprinkler to an area to be protected in a spray pattern.

27. The fire protection system according to claim 26, wherein the sprinklers are positioned at a spacing of up to 14 feet by 14 feet.

28. The fire protection system according to claim 26, wherein each sprinkler has a K-factor of at least 28 gpm/$(psi)^{1/2}$.

29. The fire protection system according to claim 26, wherein (1) the body of each sprinkler has external threads on an outer surface near the inlet orifice, (2) the piping includes connection portions having threads on an inner surface, and (3) the external threads on the outer surface of the body of each sprinkler contact the threads on the inner surface of the piping.

30. The fire protection system according to claim 26, wherein each side of each of the third slots of the planar member deflector of each sprinkler includes:

(1) an inner point; and (2) an outer point near the periphery of the planar member, wherein each side of each of the fourth slots of the planar member deflector includes:

(1) an inner point; and (2) an outer point near the periphery of the planar member, and wherein, of the plurality of tines, a tine that is defined by a third slot and a fourth slot is bent about two axes defining a plane of the planar member, so that the outer point on one side of the third slot is below a plane defined by the inner point on the one side of the third slot, the inner point on one side of the fourth slot, and the outer point on the one side of the fourth slot.

31. The fire protection system according to claim 26, wherein the planar member deflector produces a generally circular spray pattern and the body deflectors produce a generally rectangular shape spray pattern.

32. The fire protection system according to claim 26, wherein the width of the inner planar surface of the body deflectors is about 0.3 to about 1.2 times the diameter of the planar member deflector.

33. The fire protection system according to claim 26, wherein the body deflectors extend in the frame arm plane at an angle of about 10° to about 80° from the body axis.

34. The fire protection system according to claim 33, wherein the body deflectors extend in the frame arm plane at an angle of about 30° to about 60° from the body axis.

35. The fire protection system according to claim 34, wherein the body deflectors extend in the frame arm plane at an angle of about 45° from the body axis.

36. A method of manufacturing a fire protection nozzle for providing fire protection, the method comprising:

(A) providing a body having:

(a) an inlet orifice;

(b) an outlet orifice, the inlet orifice and the outlet orifice defining a body axis and a flow passage for a fluid that flows through the body in an output direction;

(c) frame arms having proximal ends connected to the outlet orifice and distal ends, the frame arms defining a frame arm plane;

(d) a junction formed by the distal ends of the frame arms at a distance from the outlet orifice, the junction including a central bore and an outer wall; and (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth; and (B) mounting a planar member deflector to the body of the nozzle, the deflector comprising a planar member having a plurality of slots on a periphery of the planar member, the plurality of slots including:

(a) first slots each having a first slot axis that is at an angle relative to the frame arm plane, and at another angle relative to an adjacent first slot, each of the first slots having a first slot depth;

(b) second slots each having a second slot axis that is at an angle relative to the frame arm plane, and at another angle relative to an adjacent second slot, each of the second slots having a second slot depth that is less than the first slot depth;

(c) third slots each being adjacent to a second slot, and each having a third slot axis that is at an angle to the second slot axis of the adjacent second slot, each of the third slots having a third slot depth that is less than the second slot depth; and (d) fourth slots each being adjacent to a first slot, and each having a first slot portion having an axis, and a second slot portion, extending outward from the first slot portion relative to a center of the planar member, the second slot portion having an axis, and a width that increases from an inner end of the second slot portion toward an outer, peripheral end of the second slot portion, and each of the fourth slots having a fourth slot depth that is less than the first slot depth.

37. The method of manufacturing a fire protection nozzle according to claim 36, further comprising securing the planar member deflector to the junction by rolling the outer wall of the junction over an edge of a mounting hole on a lower surface of a planar member deflector.

38. The method of manufacturing a fire protection nozzle according to claim 36, wherein the central bore of the junction has a threaded surface, and the method further comprises:

(C) securing the planar member deflector to the junction by a securing portion that includes:

(a) a securing screw having a head and a threaded portion that contacts the threaded surface of the central bore of the junction; and (b) a retaining nut that is mounted to the securing screw.

39. The method of manufacturing a fire protection nozzle according to claim 36, wherein the planar member deflector produces a generally circular spray pattern and the body deflectors produce a generally rectangular shape spray pattern.

40. The method of manufacturing a fire protection nozzle according to claim 36, wherein the width of the inner planar surface of the body deflectors is about 0.3 to about 1.2 times the diameter of the planar member deflector.

41. The method of manufacturing a fire protection nozzle according to claim 36, wherein the body deflectors extend in the frame arm plane at an angle of about 10° to about 80° from the body axis.

42. The method of manufacturing a fire protection nozzle according to claim 41, wherein the body deflectors extend in the frame arm plane at an angle of about 30° to about 60° from the body axis.

43. The method of manufacturing a fire protection nozzle according to claim 42, wherein the body deflectors extend in the frame arm plane at an angle of about 45° from the body axis.

44. A method of manufacturing an extended coverage fire protection sprinkler for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty-five feet, the method comprising:

(A) providing a body having:

(a) an inlet orifice;

(b) an outlet orifice, the inlet orifice and the outlet orifice defining a body axis and a flow passage for a fluid that flows through the body in an output direction;

(c) frame arms having proximal ends connected to the outlet orifice and distal ends, the frame arms defining a frame arm plane;

(d) a junction formed by the distal ends of the frame arms at a distance from the outlet orifice, the junction including a central bore having threads on an inner surface, and an outer wall; and (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth;

(B) mounting a planar member deflector to the body of the sprinkler, the deflector comprising a planar member having a plurality of slots on a periphery of the planar member, the plurality of slots including:

(a) first slots each having a first slot axis that is at an angle relative to the plane defined by the frame arms, each of the first slots having a first slot depth;

(b) second slots having a second slot axis that is at an angle relative to the frame arm plane, each of the second slots having a second slot depth;

(c) third slots each having a third slot axis that coincides with the frame arm plane, the third slots having a third slot depth that is less than the first slot depth;

(d) fourth slots each being adjacent to a third slot, and each having a fourth slot axis that is at an angle relative to the third slot axis of an adjacent third slot, the fourth slots having a fourth slot depth that is less than the third slot depth; and (e) fifth slots each being adjacent to one of the first slots, and each fifth slot having a fifth slot axis that is at an angle relative to the first slot axis of an adjacent first slot, and each of the fifth slots having a fifth slot depth that is less than the first slot depth;

(C) securing the planar member deflector to the junction of the body using a securing portion; and (D) providing an actuation mechanism including:

(a) a thermally responsive element supported by a threaded portion of a securing screw that extends through the central bore of the junction, the thermally responsive element being configured to fail when ambient temperature reaches a predetermined temperature; and (b) an outlet seal that is supported by the thermally responsive element and that seals the outlet orifice until the thermally responsive element fails.

45. The method of manufacturing an extended coverage fire protection sprinkler according to claim 44, wherein each side of each of the third slots of the planar member deflector includes:

(i) an inner point; and (ii) an outer point near the periphery of the planar member, wherein each side of each of the fourth slots of the planar member deflector includes:

(i) an inner point; and (ii) an outer point near the periphery of the planar member, and wherein, of the plurality of tines, a tine that is defined by a third slot and a fourth slot is bent about two axes defining a plane of the planar member, so that the outer point on one side of the third slot is below a plane defined by the inner point on the one side of the third slot, the inner point on one side of the fourth slot, and the outer point on the one side of the fourth slot.

46. The method of manufacturing an extended coverage fire protection sprinkler according to claim 44, wherein the planar member deflector produces a generally circular spray pattern and the body deflectors produce a generally rectangular shape spray pattern.

47. The method of manufacturing an extended coverage fire protection sprinkler according to claim 44, wherein the width of the inner planar surface of the body deflectors is about 0.3 to about 1.2 times the diameter of the planar member deflector.

48. The method of manufacturing an extended coverage fire protection sprinkler according to claim 44, wherein the body deflectors extend in the frame arm plane at an angle of about 10° to about 80° from the body axis.

49. The method of manufacturing an extended coverage fire protection sprinkler according to claim 48, wherein the body deflectors extend in the frame arm plane at an angle of about 30° to about 60° from the body axis.

50. The method of manufacturing an extended coverage fire protection sprinkler according to claim 49, wherein the body deflectors extend in the frame arm plane at an angle of about 45° from the body axis.

51. A fire protection nozzle for providing fire protection, the fire protection nozzle comprising:

(A) a body comprising:

(a) an inlet orifice;

(b) an outlet orifice, the inlet orifice and the outlet orifice defining a body axis and a flow passage for a fluid that flows through the body in an output direction;

(c) frame arms having proximal ends connected to the outlet orifice and distal ends, the frame arms defining a frame arm plane;

(d) a junction formed by the distal ends of the frame arms at a distance from the outlet orifice; and (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth; and (B) a planar member deflector configured to be mounted to the body of the nozzle, the deflector comprising a planar member having a plurality of slots on a periphery of the planar member that define a plurality of tines, the plurality of slots including:

(a) first slots each having a first slot axis that is at an angle relative to the frame arm plane, and at another angle relative to an adjacent first slot, each of the first slots having a first slot depth;

(b) second slots each having a second slot axis that is at an angle relative to the frame arm plane, and at another angle relative to an adjacent second slot, each of the second slots having a second slot depth that is less than the first slot depth;

(c) third slots each being adjacent to a second slot, and each having a third slot axis that is at an angle relative to the second slot axis of the adjacent second slot, each of the third slots having a third slot depth that is less than the second slot depth; and (d) fourth slots each being adjacent to a first slot, and each having a first slot portion having an axis, and a second slot portion, extending outward from the first slot portion relative to a center of the planar member, the second slot portion having an axis, and a width that increases from an inner end of the second slot portion toward an outer, peripheral end of the second slot portion, and each of the fourth slots having a fourth slot depth that is less than the first slot depth.

52. The fire protection nozzle according to claim 51, wherein a central bore of the junction has a threaded surface, and wherein the planar member deflector is secured to the junction by a securing portion that includes:

(i) a securing screw having a head and a threaded portion that contacts the threaded surface of the central bore of the junction; and (ii) a retaining nut that is mounted to the securing screw.

53. The fire protection nozzle according to claim 51, wherein the nozzle has a K-factor of at least 28 gpm/(psi)$^{1/2}$.

54. The fire protection nozzle according to claim 51, wherein the planar member deflector produces a generally circular spray pattern and the body deflectors produce a generally rectangular shape spray pattern.

55. The fire protection nozzle according to claim 51, wherein the width of the inner planar surface of the body deflectors is about 0.3 to about 1.2 times the diameter of the planar member deflector.

56. The fire protection nozzle according to claim 51, wherein the body deflectors extend in the frame arm plane at an angle of about 10° to about 80° from the body axis.

57. The fire protection nozzle according to claim 56, wherein the body deflectors extend in the frame arm plane at an angle of about 30° to about 60° from the body axis.

58. The fire protection nozzle according to claim 57, wherein the body deflectors extend in the frame arm plane at an angle of about 45° from the body axis.

59. A fire protection system comprising:

(A) a plurality of fire protection nozzles, each nozzle comprising:

(a) a body comprising:

(i) an inlet orifice;

(ii) an outlet orifice, the inlet orifice and the outlet orifice defining a body axis and a flow passage for a fluid that flows through the body in an output direction;

(iii) frame arms having proximal ends connected to the outlet orifice and distal ends, the frame arms defining a frame arm plane;

(iv) a junction formed by the distal ends of the frame arms at a distance from the outlet orifice, the junction including a central bore and an outer wall; and (v) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth; and (b) a planar member deflector configured to be mounted to the body of the nozzle, the deflector comprising a planar member having a plurality of slots on a periphery of the planar member that define a plurality of tines, the plurality of slots including:

(i) first slots each having a first slot axis that is at an angle relative to the frame arm plane, and at another angle relative to an adjacent first slot, each of the first slots having a first slot depth;

(ii) second slots each having a second slot axis that is at an angle relative to the frame arm plane, and at another angle relative to an adjacent second slot, each of the second slots having a second slot depth that is less than the first slot depth;

(iii) third slots each being adjacent to a second slot, and each having a third slot axis that is at an angle relative to the second slot axis of an adjacent second slot, the third slots having a third slot depth that is less than the second slot depth; and (iv) fourth slots each being adjacent to a first slot, and each having a first slot portion having an axis, and a second slot portion, extending outward from the first slot portion relative to a center of the planar member, the second slot portion having an axis, and a width that increases from an inner end of the second slot portion toward an outer, peripheral end of the second slot portion, and each of the fourth slots having a fourth slot depth that is less than the first slot depth; and (B) an actuation valve connected to a fluid supply, wherein, when the actuation valve is operated, the fluid supply supplies fluid to piping and the plurality of nozzles, such that the fluid is delivered by the nozzles to an area to be protected in a spray pattern.

60. The fire protection system according to claim 59, wherein each nozzle has a K-factor of at least 28 gpm/(psi)$^{1/2}$.

61. The fire protection system according to claim 59, wherein the nozzles are positioned at a spacing of up to 20 feet by 20 feet.

62. The fire protection system according to claim 59, wherein (1) the body of each nozzle has external threads on an outer surface near the inlet orifice, (2) the piping includes connection portions having threads on an inner surface, and (3) the external threads on the outer surface of the body of each nozzle contact the threads on the inner surface of the piping.

63. The fire protection system according to claim 59, wherein the deflector on each nozzle is secured to the junction of each nozzle by rolling the outer wall of the junction over an edge of a mounting hole on a lower surface of the deflector.

64. The fire protection system according to claim 59, wherein the central bore of the junction of each nozzle has a threaded surface, and wherein the planar member deflector is secured to the junction by a mounting portion that includes:

(1) a securing screw having a head and a threaded portion that contacts the threaded surface of the central bore of the junction; and (2) a retaining nut that is mounted to the securing screw.

65. The fire protection system according to claim 59, wherein the planar member deflector produces a generally circular spray pattern and the body deflectors produce a generally rectangular shape spray pattern.

66. The fire protection system according to claim 59, wherein the width of the inner planar surface of the body deflectors is about 0.3 to about 1.2 times the diameter of the planar member deflector.

67. The fire protection system according to claim 59, wherein the body deflectors extend in the frame arm plane at an angle of about 10° to about 80° from the body axis.

68. The fire protection system according to claim 67, wherein the body deflectors extend in the frame arm plane at an angle of about 30° to about 60° from the body axis.

69. The fire protection system according to claim 68, wherein the body deflectors extend in the frame arm plane at an angle of about 45° from the body axis.

70. An extended coverage fire protection sprinkler for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty-five feet, the extended coverage fire protection sprinkler comprising:

(A) a body comprising:

(a) an inlet orifice;

(b) an outlet orifice, the inlet orifice and the outlet orifice defining a body axis and a flow passage for a fluid that flows through the body in an output direction;

(c) frame arms having proximal ends connected to the outlet orifice and distal ends, the frame arms defining a frame arm plane;

(d) a junction formed by the distal ends of the frame arms at a distance from the outlet orifice, the junction including a central bore having threads on an inner surface, and an outer wall; and (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth;

(B) a planar member deflector configured to be mounted to the body of the sprinkler, the deflector comprising a planar member having a plurality of slots on a periphery of the planar member that define a plurality of tines, the plurality of slots including:

(a) first slots each having a first slot axis that is at an angle relative to the plane defined by the frame arms, each of the first slots having a first slot depth;

(b) second slots having a second slot axis that is at an angle relative to the frame arm plane, each of the second slots having a second slot depth;

(c) third slots each having a third slot axis that coincides with the frame arm plane, the third slots having a third slot depth that is less than the first slot depth;

(d) fourth slots each being adjacent to a third slot, and each having a fourth slot axis that is at an angle relative to the third slot axis of an adjacent third slot, the fourth slots having a fourth slot depth that is less than the third slot depth; and (e) fifth slots each being adjacent to one of the first slots, and each fifth slot having a fifth slot axis that is at an angle relative to the first slot axis of an adjacent first slot, and each of the fifth slots having a fifth slot depth that is less than the first slot depth;

(C) a securing portion configured to secure the planar member deflector to the junction of the body; and (D) an actuation mechanism including:

(a) a thermally responsive element supported by a threaded portion of a securing screw that extends through the central bore of the junction, the thermally responsive element being configured to fail when ambient temperature reaches a predetermined temperature; and (b) an outlet seal that is supported by the thermally responsive element and that seals the outlet orifice until the thermally responsive element fails.

71. The extended coverage fire protection sprinkler according to claim 70, wherein each side of each of the third slots of the planar member deflector includes:

(i) an inner point; and (ii) an outer point near the periphery of the planar member, wherein each side of each of the fourth slots of the planar member deflector includes:

(i) an inner point; and (ii) an outer point near the periphery of the planar member, and wherein, of the plurality of tines, a tine that is defined by a third slot and a fourth slot is bent about two axes defining a plane of the planar member, so that the outer point on one side of the third slot is below a plane defined by the inner point on the one side of the third slot, the inner point on one side of the fourth slot, and the outer point on the one side of the fourth slot.

72. The extended coverage fire protection sprinkler according to claim 70, wherein the planar member deflector produces a generally circular spray pattern and the body deflectors produce a generally rectangular shape spray pattern.

73. The extended coverage fire protection sprinkler according to claim 70, wherein the width of the inner planar surface of the body deflectors is about 0.3 to about 1.2 times the diameter of the planar member deflector.

74. The extended coverage fire protection sprinkler according to claim 70, wherein the body deflectors extend in the frame arm plane at an angle of about 10° to about 80° from the body axis.

75. The extended coverage fire protection sprinkler according to claim 74, wherein the body deflectors extend in the frame arm plane at an angle of about 30° to about 60° from the body axis.

76. The extended coverage fire protection sprinkler according to claim 75, wherein the body deflectors extend in the frame arm plane at an angle of about 45° from the body axis.

77. A fire protection system for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty-five feet, the fire protection system comprising:

(A) a plurality of fire protection sprinklers, each sprinkler comprising:

(a) a body comprising:

(i) an inlet orifice;

(ii) an outlet orifice, the inlet orifice and the outlet orifice defining a body axis and a flow passage for a fluid that flows through the body in an output direction;

(iii) frame arms having proximal ends connected to the outlet orifice and distal ends, the frame arms defining a frame arm plane;

(iv) a junction formed by the distal ends of the frame arms at a distance from the outlet orifice; and (v) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth;

(b) a planar member deflector configured to be mounted to the body of the sprinkler, the deflector comprising a planar member having a plurality of slots on a periphery of the planar member that define a plurality of tines, the plurality of slots including:

(i) first slots each having a first slot axis that is at an angle relative to the plane defined by the frame arms, each of the first slots having a first slot depth;

(ii) second slots having a second slot axis that is at an angle relative to the frame arm plane, each of the second slots having a second slot depth;

(iii) third slots each having a third slot axis that coincides with the frame arm plane, the third slots having a third slot depth that is less than the first slot depth;

(iv) fourth slots each being adjacent to a third slot, and each having a fourth slot axis that is at an angle relative to the third slot axis of an adjacent third slot, the fourth slots having a fourth slot depth that is less than the third slot depth; and (v) fifth slots each being adjacent to one of the first slots, and each fifth slot having a fifth slot axis that is at an angle relative to the first slot axis of an adjacent first slot, and each of the fifth slots having a fifth slot depth that is less than the first slot depth; and (c) an actuation mechanism including:

(i) a thermally responsive element supported by a threaded portion of a securing screw that extends through a central bore of the junction, the thermally responsive element being configured to fail when ambient temperature reaches a predetermined temperature; and (ii) an outlet seal that is supported by the thermally responsive element and that seals the outlet orifice until the thermally responsive element fails, wherein, when the thermally responsive element of at least one of the sprinklers fails, a fluid supply supplies a fluid to the at least one sprinkler through piping, and the fluid is delivered by the at least one sprinkler to the area to be protected in a spray pattern.

78. The fire protection system according to claim 77, wherein the sprinklers are positioned at a spacing of up to 14 feet by 14 feet.

79. The fire protection system according to claim 77, wherein each sprinkler has a K-factor of at least 28 gpm/(psi)$^{1/2}$.

80. The fire protection system according to claim 77, wherein (1) the body of each sprinkler has external threads on an outer surface near the inlet orifice, (2) the piping includes connection portions having threads on an inner surface, and (3) the external threads on the outer surface of the body of each sprinkler contact the threads on the inner surface of the piping.

81. The fire protection system according to claim 77, wherein each side of each of the third slots of the planar member deflector of each sprinkler includes:

(1) an inner point; and (2) an outer point near the periphery of the planar member, wherein each side of each of the fourth slots of the planar member deflector includes:

(1) an inner point; and (2) an outer point near the periphery of the planar member, and wherein, of the plurality of tines, a tine that is defined by a third slot and a fourth slot is bent about two axes defining a plane of the planar member, so that the outer point on one side of the third slot is below a plane defined by the inner point on the one side of the third slot, the inner point on one side of the fourth slot, and the outer point on the one side of the fourth slot.

82. The fire protection system according to claim 77 wherein the planar member deflector produces a generally circular spray pattern and the body deflectors produce a generally rectangular shape spray pattern.

83. The fire protection system according to claim 77, wherein the width of the inner planar surface of the body deflectors is about 0.3 to about 1.2 times the diameter of the planar member deflector.

84. The fire protection system according to claim 77, wherein the body deflectors extend in the frame arm plane at an angle of about 10° to about 80° from the body axis.

85. The fire protection system according to claim 84, wherein the body deflectors extend in the frame arm plane at an angle of about 30° to about 60° from the body axis.

86. The fire protection system according to claim 85, wherein the body deflectors extend in the frame arm plane at an angle of about 45° from the body axis.

87. A method of manufacturing a fire protection nozzle for providing fire protection, the method comprising:

(A) providing a body having:

(a) an inlet orifice;

(b) an outlet orifice, the inlet orifice and the outlet orifice defining a body axis and a flow passage for a fluid that flows through the body in an output direction;

(c) frame arms having proximal ends connected to the outlet orifice and distal ends, the frame arms defining a frame arm plane;

(d) a junction formed by the distal ends of the frame arms at a distance from the outlet orifice, the junction including a central bore and an outer wall; and (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth; and (B) mounting a planar member deflector to the body of the nozzle, the deflector comprising a planar member having a plurality of slots on a periphery of the planar member, the plurality of slots including:

(a) first slots each having a first slot axis that is at an angle relative to the frame arm plane, and at another angle relative to an adjacent first slot, each of the first slots having a first slot depth;

(b) second slots each having a second slot axis that is at an angle relative to the frame arm plane, and at another angle relative to an adjacent second slot, each of the second slots having a second slot depth that is less than the first slot depth;

(c) third slots each being adjacent to a second slot, and each having a third slot axis that is at an angle to the second slot axis of the adjacent second slot, each of the third slots having a third slot depth that is less than the second slot depth; and (d) fourth slots each being adjacent to a first slot, and each having a first slot portion having an axis, and a second slot portion, extending outward from the first slot portion relative to a center of the planar member, the second slot portion having an axis, and a width that increases from an inner end of the second slot portion toward an outer, peripheral end of the second slot portion, and each of the fourth slots having a fourth slot depth that is less than the first slot depth.

88. The method of manufacturing a fire protection nozzle according to claim 87, further comprising securing the planar member deflector to the junction by rolling the outer wall of the junction over an edge of a mounting hole on a lower surface of the planar member deflector.

89. The method of manufacturing a fire protection nozzle according to claim 87, wherein the central bore of the junction has a threaded surface, and the method further comprises:

(C) securing the planar member deflector to the junction by a securing portion that includes:

(a) a securing screw having a head and a threaded portion that contacts the threaded surface of the central bore of the junction; and (b) a retaining nut that is mounted to the securing screw.

90. The method of manufacturing a fire protection nozzle according to claim 87, wherein the planar member deflector produces a generally circular spray pattern and the body deflectors produce a generally rectangular shape spray pattern.

91. The method of manufacturing a fire protection nozzle according to claim 87, wherein the width of the inner planar surface of the body deflectors is about 0.3 to about 1.2 times the diameter of the planar member deflector.

92. The method of manufacturing a fire protection nozzle according to claim 87, wherein the body deflectors extend in the frame arm plane at an angle of about 10° to about 80° from the body axis.

93. The method of manufacturing a fire protection nozzle according to claim 92, wherein the body deflectors extend in the frame arm plane at an angle of about 30° to about 60° from the body axis.

94. The method of manufacturing a fire protection nozzle according to claim 93, wherein the body deflectors extend in the frame arm plane at an angle of about 45° from the body axis.

95. A method of manufacturing an extended coverage fire protection sprinkler for storage applications including protection of an occupancy hazard including classes I-IV and Group A cartoned, unexpanded plastics, as defined by NFPA 13 and FM Global Property Loss Prevention Data Sheets 8-1 and 8-9, stored in a storage area having a ceiling height of greater than thirty-five feet, the method comprising:

(A) providing a body having:

(a) an inlet orifice;

(b) an outlet orifice, the inlet orifice and the outlet orifice defining a body axis and a flow passage for a fluid that flows through the body in an output direction;

(c) frame arms having proximal ends connected to the outlet orifice and distal ends, the frame arms defining a frame arm plane;

(d) a junction formed by the distal ends of the frame arms at a distance from the outlet orifice, the junction including a central bore having threads on an inner surface, and an outer wall; and (e) body deflectors that extend from each of the frame arms in the frame arm plane at an angle relative to the body axis, each of the body deflectors having an inner planar surface that faces the junction, the inner planar surface having a depth in the frame arm plane and a width, perpendicular to the depth;

(B) mounting a planar member deflector to the body of the sprinkler, the deflector comprising a planar member having a plurality of slots on a periphery of the planar member, the plurality of slots including:

(a) first slots each having a first slot axis that is at an angle relative to the plane defined by the frame arms, each of the first slots having a first slot depth;

(b) second slots having a second slot axis that is at an angle relative to the frame arm plane, each of the second slots having a second slot depth;

(c) third slots each having a third slot axis that coincides with the frame arm plane, the third slots having a third slot depth that is less than the first slot depth;

(d) fourth slots each being adjacent to a third slot, and each having a fourth slot axis that is at an angle relative to the third slot axis of an adjacent third slot, the fourth slots having a fourth slot depth that is less than the third slot depth; and (e) fifth slots each being adjacent to one of the first slots, and each fifth slot having a fifth slot axis that is at an angle relative to the first slot axis of an adjacent first slot, and each of the fifth slots having a fifth slot depth that is less than the first slot depth;

(C) securing the planar member deflector to the junction of the body using a securing portion including:

(a) a securing screw having a head and a threaded portion that contacts a threaded surface of the central bore of the junction when the securing screw is inserted into the central bore; and (b) a retaining nut that is mounted to the securing screw; and (D) providing an actuation mechanism including:

(a) a thermally responsive element supported by the threaded portion of the securing screw that extends through the central bore of the junction, the thermally responsive element being configured to fail when ambient temperature reaches a predetermined temperature; and (b) an outlet seal that is supported by the thermally responsive element and that seals the outlet orifice until the thermally responsive element fails.

96. The method of manufacturing an extended coverage fire protection sprinkler according to claim 95, wherein each side of each of the third slots of the planar member deflector includes:

(i) an inner point; and (ii) an outer point near the periphery of the planar member, wherein each side of each of the fourth slots of the planar member deflector includes:

(i) an inner point; and (ii) an outer point near the periphery of the planar member, and wherein, of the plurality of tines, a tine that is defined by a third slot and a fourth slot is bent about two axes defining a plane of the planar member, so that the outer point on one side of the third slot is below a plane defined by the inner point on the one side of the third slot, the inner point on one side of the fourth slot, and the outer point on the one side of the fourth slot.

97. The method of manufacturing an extended coverage fire protection sprinkler according to claim 95, wherein the planar member deflector produces a generally circular spray pattern and the body deflectors produce a generally rectangular shape spray pattern.

98. The method of manufacturing an extended coverage fire protection sprinkler according to claim 95, wherein the width of the inner planar surface of the body deflectors is about 0.3 to about 1.2 times the diameter of the planar member deflector.

99. The method of manufacturing an extended coverage fire protection sprinkler according to claim 95, wherein the body deflectors extend in the frame arm plane at an angle of about 10° to about 80° from the body axis.

100. The method of manufacturing an extended coverage fire protection sprinkler according to claim 99, wherein the body deflectors extend in the frame arm plane at an angle of about 30° to about 60° from the body axis.

101. The method of manufacturing an extended coverage fire protection sprinkler according to claim 100, wherein the body deflectors extend in the frame arm plane at an angle of about 45° from the body axis.

* * * * *